(12) United States Patent
Kawano et al.

(10) Patent No.: US 11,803,352 B2
(45) Date of Patent: Oct. 31, 2023

(54) INFORMATION PROCESSING APPARATUS AND INFORMATION PROCESSING METHOD

(71) Applicant: SONY CORPORATION, Tokyo (JP)

(72) Inventors: Shinichi Kawano, Tokyo (JP); Yuhei Taki, Kanagawa (JP); Hiro Iwase, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 483 days.

(21) Appl. No.: 16/970,080

(22) PCT Filed: Dec. 6, 2018

(86) PCT No.: PCT/JP2018/044834
§ 371 (c)(1),
(2) Date: Aug. 14, 2020

(87) PCT Pub. No.: WO2019/163255
PCT Pub. Date: Aug. 29, 2019

(65) Prior Publication Data
US 2021/0157545 A1 May 27, 2021

(30) Foreign Application Priority Data
Feb. 23, 2018 (JP) .................................. 2018-031185

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/017* (2013.01); *G06F 3/165* (2013.01); *G10L 15/22* (2013.01);
(Continued)

(58) Field of Classification Search
CPC ........ G06F 3/048; G06F 3/0484; G06F 3/012; G06F 3/0488; G06F 3/167; G06F 3/013;
(Continued)

(56) References Cited

U.S. PATENT DOCUMENTS 9,135,914 B1 * 9/2015 Bringert ................... G10L 15/22
9,672,336 B1 * 6/2017 Spence ..................... G06F 21/32
(Continued)

FOREIGN PATENT DOCUMENTS

CN        1826636 A      8/2006
CN     104204729 A    12/2014
(Continued)

OTHER PUBLICATIONS

International Search Report and Written Opinion of PCT Application No. PCT/JP2018/044834, dated Feb. 19, 2019, 13 pages of ISRWO.

*Primary Examiner* — Mark Villena
(74) *Attorney, Agent, or Firm* — CHIP LAW GROUP

(57) ABSTRACT

Provided is an information processing apparatus and an information processing method which can adaptively switch a user interface to be used by a user to environmental information. The information processing apparatus includes an interface control unit that switches a user interface to be used by a first user at least between a first user interface using voice and a second user interface different from the first user interface on the basis of environmental information.

19 Claims, 15 Drawing Sheets

(51) Int. Cl.
*G10L 15/22* (2006.01)
*G10L 25/63* (2013.01)
(52) U.S. Cl.
CPC ........ *G10L 25/63* (2013.01); *G06F 2203/011* (2013.01); *G10L 2015/223* (2013.01)
(58) Field of Classification Search
CPC ......... G06F 8/38; G06F 3/0481; G06V 20/20; G10L 15/22
See application file for complete search history.

(56) References Cited

U.S. PATENT DOCUMENTS

| | | | |
|---|---|---|---|
| 10,359,993 B2* | 7/2019 | Roman | G10L 25/51 |
| 2005/0108642 A1 | 5/2005 | Sinclair | |
| 2012/0030584 A1* | 2/2012 | Bian | G06F 9/451 |
| | | | 715/746 |
| 2013/0002531 A1* | 1/2013 | Krahenbuhl | G06F 3/0416 |
| | | | 345/156 |
| 2013/0145144 A1* | 6/2013 | Newell | G06F 3/0482 |
| | | | 713/100 |
| 2013/0265261 A1 | 10/2013 | Min | |
| 2015/0123919 A1 | 5/2015 | Yamada et al. | |
| 2015/0227194 A1 | 8/2015 | Kubota et al. | |
| 2016/0357380 A1* | 12/2016 | Boettcher | G06F 3/167 |
| 2017/0090560 A1* | 3/2017 | Chen | H04N 21/42224 |
| 2017/0213553 A1* | 7/2017 | Gunn | G06F 1/3234 |
| 2017/0228139 A1* | 8/2017 | Goslin | G06F 3/011 |
| 2018/0107445 A1 | 4/2018 | Ohmura | |
| 2018/0121681 A1* | 5/2018 | Huang | G06F 21/84 |
| 2018/0241870 A1* | 8/2018 | Mukherjee | H04M 1/7243 |
| 2019/0033964 A1* | 1/2019 | Kulkarni | G06F 3/04842 |
| 2019/0079657 A1* | 3/2019 | Hwang | G06F 3/0346 |
| 2019/0205513 A1* | 7/2019 | Priya | G06F 21/316 |

FOREIGN PATENT DOCUMENTS

| | | |
|---|---|---|
| CN | 107408028 A | 11/2017 |
| CN | 108431667 A | 8/2018 |
| EP | 2648077 A1 | 10/2013 |
| EP | 2869178 A1 | 5/2015 |
| EP | 3279791 A1 | 2/2018 |
| JP | 2007-511833 A | 5/2007 |
| JP | 2014-085954 A | 5/2014 |
| JP | 2015-090547 A | 5/2015 |
| JP | 2015-517149 A | 6/2015 |
| JP | 2017-120550 A | 7/2017 |
| KR | 10-2006-0114280 A | 11/2006 |
| KR | 10-2013-0113897 A | 10/2013 |
| WO | 2005/057327 A2 | 6/2005 |
| WO | 2010/084881 A1 | 7/2010 |
| WO | 2013/154321 A1 | 10/2013 |
| WO | 2014/065254 A1 | 5/2014 |
| WO | 2016/158792 A1 | 10/2016 |
| WO | 2017/115618 A1 | 7/2017 |

* cited by examiner

FIG.3

| | | ENVIRONMENTAL INFORMATION |
|---|---|---|
| USER STATUS | | DEGREE OF CONCENTRATION ON OTHER WORK |
| | | DISTANCE TO SYSTEM |
| | | POSTURE OF USER |
| | | AWARENESS OF USER |
| | | INTENTION OF USER INDICATING UI TO USE |
| | | FATIGUE LEVEL OF USER |
| | | VISUAL FIELD OF USER |
| | | USAGE STATUS OF ANOTHER DEVICE |
| SURROUNDING STATUS OF SYSTEM | REAL SPACE | AMBIENT NOISE |
| | | APPROVAL OR DISAPPROVAL REGARDING VOICE USAGE BY SURROUNDING PERSON |
| | | STATUS OF SURROUNDING PERSON |
| | VIRTUAL SPACE | APPROVAL OR DISAPPROVAL REGARDING VOICE USAGE BY SURROUNDING PERSON IN VIRTUAL WORLD |

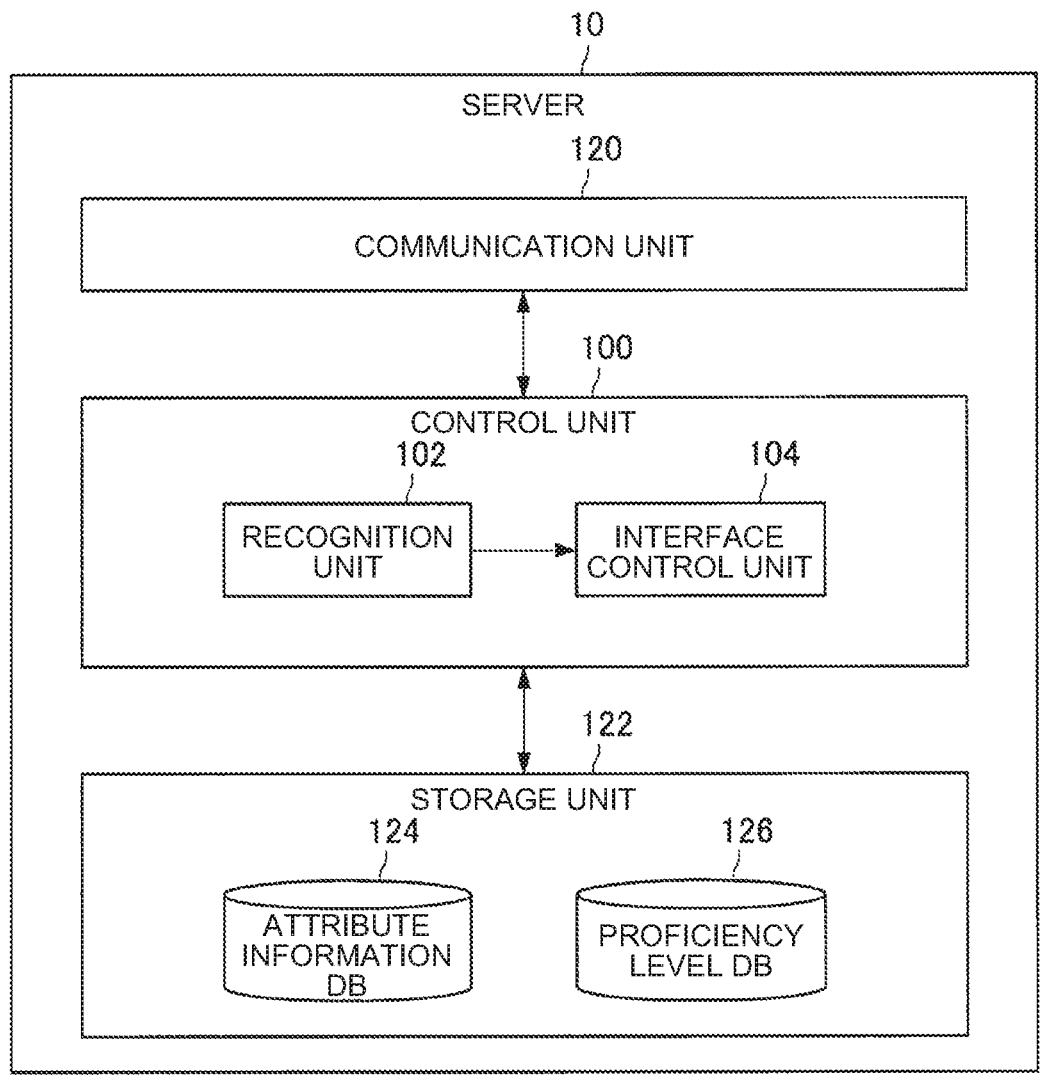

| USER NAME | A | B |
|---|---|---|
| OPERATING GAME MACHINE | ACCUSTOMED | NOT ACCUSTOMED |
| GAME USAGE HISTORY | 3 YEARS | NONE |
| VOICE INPUT | NOT ACCUSTOMED | ACCUSTOMED |
| TARGET SERVICE USAGE HISTORY | FREQUENTLY USE | NEVER USE |

FIG.17
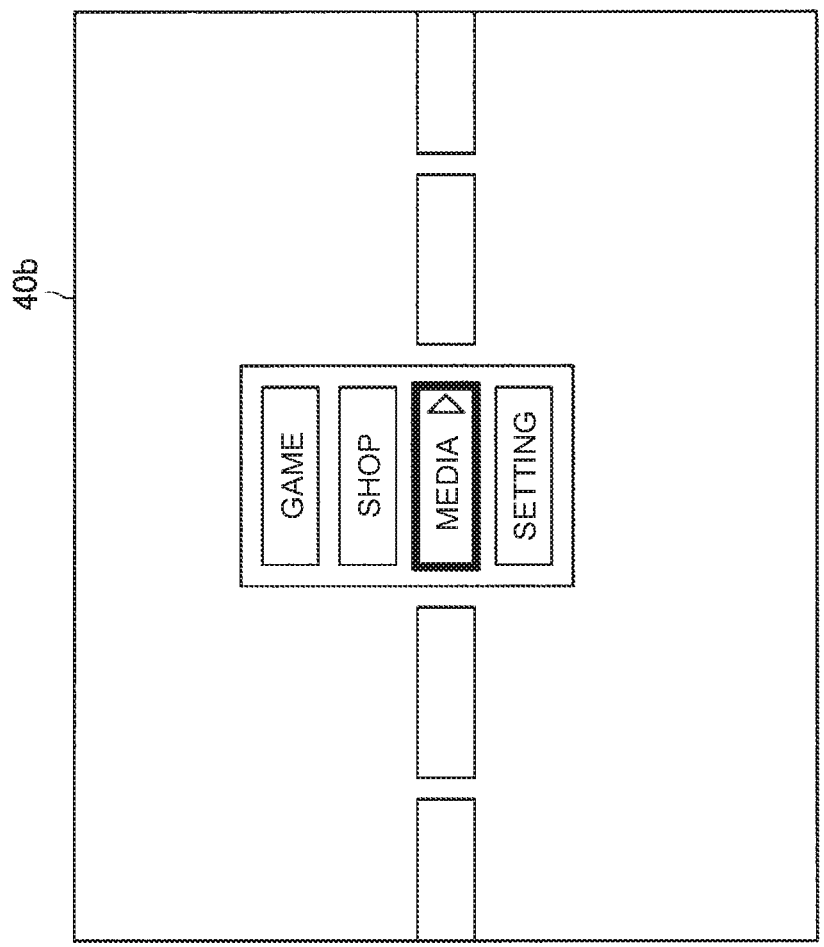
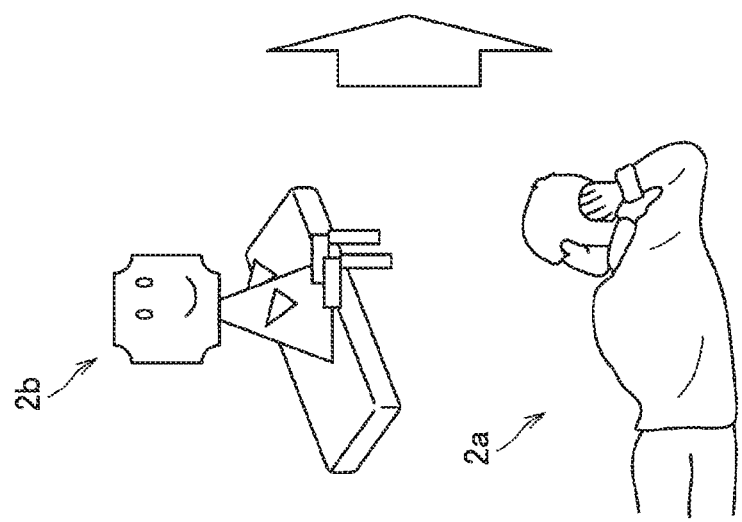

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/044834 filed on Dec. 6, 2018, which claims priority benefit of Japanese Patent Application No. JP 2018-031185 filed in the Japan Patent Office on Feb. 23, 2018. Each of the above-referenced applications is hereby incorporated herein by reference in its entirety.

FIELD

The present disclosure relates to an information processing apparatus, an information processing method, and a program.

BACKGROUND

Conventionally, research on a user interface (UI) has been conducted for the purpose of improving operability for an information processing apparatus such as a general-purpose personal computer (PC).

For example, Patent Literature 1 below describes a technique of determining a proficiency level of a user's dialogue behavior and changing a dialogue control on the basis of the proficiency level.

CITATION LIST

Patent Literature

Patent Literature 1: International Publication No. 2010/84881

SUMMARY

Technical Problem

However, in the technique described in Patent Literature 1, switching a user interface to be used by a user is not considered.

Therefore, the present disclosure proposes new and improved information processing apparatus, information processing method, and program which can adaptively switch a user interface to be used by a user to environmental information.

Solution to Problem

According to the present disclosure, an information processing apparatus is provided that includes: an interface control unit that switches a user interface to be used by a first user at least between a first user interface using voice and a second user interface different from the first user interface on the basis of environmental information.

Moreover, according to the present disclosure, an information processing method is provided that includes: causing a processor to switch a user interface to be used by a first user at least between a first user interface using voice and a second user interface different from the first user interface on the basis of environmental information.

Moreover, according to the present disclosure, a program is provided that causes a computer to function as an interface control unit that switches a user interface to be used by a first user at least between a first user interface using voice and a second user interface different from the first user interface on the basis of environmental information.

Advantageous Effects of Invention

As described above, according to the present disclosure, it is possible to adaptively switch a user interface to be used by a user to environmental information. Note that the effects described here are not necessarily limited, and may be any of the effects described in the present disclosure.

BRIEF DESCRIPTION OF DRAWINGS

FIG. 3 is a diagram schematically illustrating a configuration example of environmental information according to the same embodiment.

FIG. 4 is a block diagram illustrating a functional configuration example of a server 10 according to the same embodiment.

FIG. 5 is a diagram illustrating a configuration example of an attribute information DB 124 according to the same embodiment.

FIG. 6 is a diagram illustrating a configuration example of a proficiency level DB 126 according to the same embodiment.

FIG. 17 is a diagram illustrating an example of switching a user interface to be used by a user, according to Application Example 5 of the same embodiment.

DESCRIPTION OF EMBODIMENTS

Figure 1:
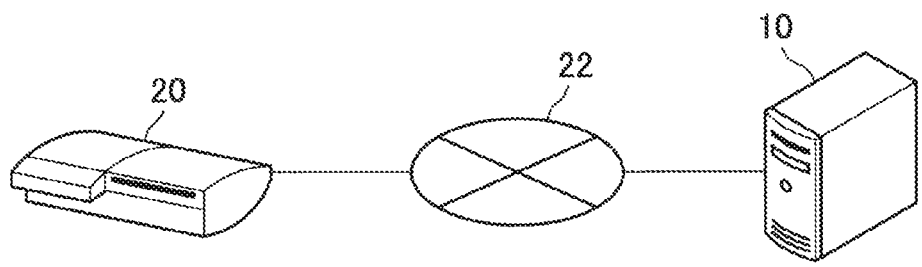
FIG. 1 is an explanatory diagram illustrating a configuration example of an information processing system according to an embodiment of the present disclosure.

Hereinafter, preferred embodiments of the present disclosure will be described in detail with reference to the accompanying drawings. In the specification and the drawings, components having substantially the same functional configuration are denoted by the same reference numerals, and redundant description is omitted.

In the specification and the drawings, a plurality of components having substantially the same functional configuration may be distinguished from each other by adding a different alphabet after the same reference numeral. For example, a plurality of components having substantially the same functional configuration are distinguished as necessary, such as a terminal 20a and a terminal 20b. However, in a case where it is not necessary to particularly distinguish each of a plurality of components having substantially the same functional configuration, only the same reference numeral is assigned. For example, in a case where it is not necessary to particularly distinguish the terminal 20a and the terminal 20b, the terminal 20a and the terminal 20b are simply referred to as the terminal 20.

Further, the "Description of Embodiments" will be described in the following item order.
1. Configuration of Information Processing System
2. Detailed Description of Embodiments
3. Application Example
4. Hardware Configuration
5. Modification Example 1. Configuration of Information Processing System First, a configuration example of an information processing system according to an embodiment of the present disclosure will be described with reference to FIG. 1. As illustrated in FIG. 1, the information processing system according to the embodiment includes a server 10, a terminal 20, and a communication network 22.

1-1. Server 10

The server 10 is an example of an information processing apparatus according to the present disclosure. The server 10 can control the operation of the terminal 20 via the communication network 22 described below. For example, the server 10 causes the terminal 20 to output a predetermined moving image or a predetermined voice on the basis of a user's instruction or the like.

1-2. Terminal 20

The terminal 20 outputs various kinds of information under the control of the server 10, for example. The terminal 20 may be, for example, a general-purpose PC, a tablet terminal, a game machine, a mobile phone such as a smart phone, a portable music player, a speaker, a projector, a wearable device such as a head mounted display (HMD) or a smart watch, an in-vehicle device (car navigation device or the like), or a robot (for example, a humanoid robot or an autonomous vehicle).

Figure 2:
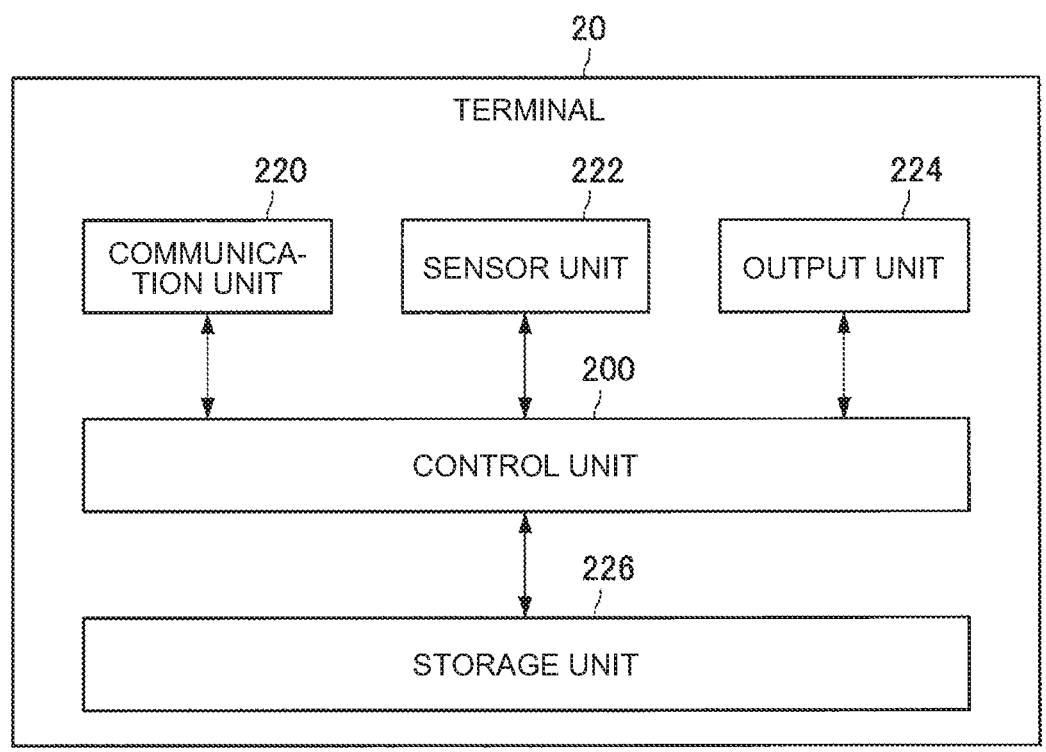
FIG. 2 is a block diagram illustrating a functional configuration example of a terminal 20 according to the same embodiment.

Here, a functional configuration of the terminal 20 will be described with reference to FIG. 2. FIG. 2 is a block diagram illustrating a functional configuration example of the terminal 20. As illustrated in FIG. 2, the terminal 20 includes a control unit 200, a communication unit 220, a sensor unit 222, an output unit 224, and a storage unit 226.

{1-2-1. Control Unit 200}

The control unit 200 can be configured to include a processing circuit such as a central processing unit (CPU) or a graphics processing unit (GPU). The control unit 200 comprehensively controls the operation of the terminal 20. For example, the control unit 200 causes the communication unit 220 to transmit various sensing results sensed by the sensor unit 222 described below to the server 10. Further, the control unit 200 causes the output unit 224 to output, according to output control information received from the server 10, information instructed by the output control information.

{1-2-2. Sensor Unit 222}

The sensor unit 222 may include a microphone. The sensor unit 222 can collect voices emitted around.

Further, the sensor unit 222 may include at least one of, for example, a camera (image sensor), a distance sensor (for example, a time-of-flight sensor, or a stereo camera), a temperature sensor, a biological sensor, an acceleration sensor, a direction sensor, and a myoelectric sensor. Further, the sensor unit 222 may further include a receiver that receives a positioning signal from a positioning satellite, such as the Global Positioning System (GPS) or a global navigation satellite system (GLONASS).

The individual sensors included in the sensor unit 222 may constantly perform sensing, may periodically perform sensing, or may perform sensing only in a specific case (for example, a case where there is an instruction from the control unit 200).

{1-2-3. Communication Unit 220}

The communication unit 220 transmits and receives information to and from another device using, for example, wireless communication and/or wired communication. For example, the communication unit 220 transmits various sensing results obtained by the sensor unit 222 (for example, voice data collected by a microphone) to the server 10 under the control of the control unit 200. In addition, the communication unit 220 receives the output control information of various videos and various sounds from the server 10.

{1-2-4. Output Unit 224}

The output unit 224 outputs various kinds of information (such as video and sound) under the control of the control unit 200. The output unit 224 may include a voice output unit. The voice output unit is configured to include, for example, a speaker, an earphone, or a headphone. The voice output unit outputs a sound (voice, music, or the like) under the control of the control unit 200.

Further, the output unit 224 may include a display unit. The display unit is configured to include, for example, a liquid crystal display (LCD), an organic light emitting diode (OLED), or a projector. The display unit displays (projects or the like) a video under the control of the control unit 200.

{1-2-5. Storage Unit 226}

The storage unit 226 stores various kinds of data and various kinds of software.

1-3. Communication Network 22

The communication network 22 is a wired or wireless transmission path for information transmitted from a device connected to the communication network 22. For example, the communication network 22 may include a telephone line network, the Internet, a public line network such as a satellite communication network, various local area networks (LANs) including Ethernet (registered trademark), a wide area network (WAN), and the like. Further, the communication network 22 may include a dedicated line network such as an Internet Protocol-virtual private network (IP-VPN).

1-4. Summary of Problem

The configuration of the information processing system according to the embodiment has been described above. By the way, an optimal user interface to be used by the user may differ depending on a status. For example, the optimal user interface differs depending on the ease of a voice input such as the volume of the ambient noise, an allowance degree of a voice input in an environment where the user is located, the user's physical condition, or the latest voice usage status of the user.

Accordingly, the server 10 according to the embodiment has been created by taking the above circumstances into consideration. The server 10 according to the embodiment can switch the user interface to be used by the user at least between a first user interface using voice (hereinafter, also referred to as a "voice UI") and a second user interface different from the first user interface (hereinafter, also referred to as a "second UI") on the basis of the environmental information. Therefore, the user can use the user interface suitable for a status.

For example, as illustrated in FIG. 3, the environmental information may include at least one of a detection result of the degree of concentration of the user, a detection result of a distance between a system (for example, the output unit 224 or the sensor unit 222) and the user, a detection result of a posture of the user, a detection result regarding awareness of the user, an estimation result of the behavior purpose of the user, a detection result of a fatigue level of the user, a detection result regarding a visual field of the user, information indicating a usage status of a voice input by the user, a sensing result of the ambient noise of a system (for example, the output unit 224 or the sensor unit 222), information indicating approval or disapproval regarding a voice usage of the user by other users located around the user, information indicating a status of the other users, and information indicating the approval or disapproval regarding the voice usage of the user by other users while the user is using a virtual reality application. The specific content of the environmental information will be described below. Hereinafter, the contents of the embodiment will be sequentially described in detail.

2. Detailed Description of Embodiments 2-1. Configuration

First, the configuration according to the embodiment will be described. FIG. 4 is a block diagram illustrating a functional configuration example of the server 10 according to the embodiment. As illustrated in FIG. 4, the server 10 includes a control unit 100, a communication unit 120, and a storage unit 122.

{2-1-1. Control Unit 100}

The control unit 100 is configured to include a processing circuit such as a CPU 150 and a GPU, which will be described below. The control unit 100 comprehensively controls the operation of the server 10. Further, as illustrated in FIG. 4, the control unit 100 includes a recognition unit 102 and an interface control unit 104.

{2-1-2. Recognition Unit 102}

The recognition unit 102 performs various kinds of recognition processing on various sensing results received from the terminal 20, for example. For example, the recognition unit 102 performs voice recognition on the voice data collected by the terminal 20, and acquires the text data corresponding to the voice recognition.

The recognition unit 102 performs image recognition on the image captured by the terminal 20, and recognizes each object shown in the image on the basis of the image recognition result. For example, the recognition unit 102 identifies an individual person shown in the image and also recognizes the behavior of the individual person (for example, whether or not he/she is uttering).

{2-1-3. Interface Control Unit 104}

The interface control unit 104 switches the user interface to be used by the user at least between the voice UI and the second UI different from the voice UI on the basis of the environmental information.

Here, the second UI may be a user interface relating to one or more of the five senses. For example, the second UI may be a user interface regarding the sense of sight, such as a graphical user interface (hereinafter, also referred to as GUI) (for example, drill-down UI) a line-of-sight user interface (hereinafter, also referred to as line-of-sight UI), or a gesture user interface (hereinafter, also referred to as a gesture UI). Alternatively, the second UI may be a user interface regarding the sense of touch, such as a touch user interface (hereinafter, also referred to as a touch UI). Alternatively, the second UI may be a user interface regarding the sense of smell such as an interface using, for example, an aroma diffuser or a user interface regarding the sense of taste.

For example, the interface control unit 104 switches the user interface to be used by the user at least between the voice UI and the second UI on the basis of a combination of the environmental information, the attribute information of the user stored in an attribute information DB 124 as illustrated in FIG. 5, and the proficiency level of the user for the voice UI or the second UI stored in a proficiency level DB 126 as illustrated in FIG. 6. The attribute information DB 124 is a database that stores the attribute information of each user. The proficiency level DB 126 is a database that stores a proficiency level regarding a voice input or the like of each user.

Figure 7:
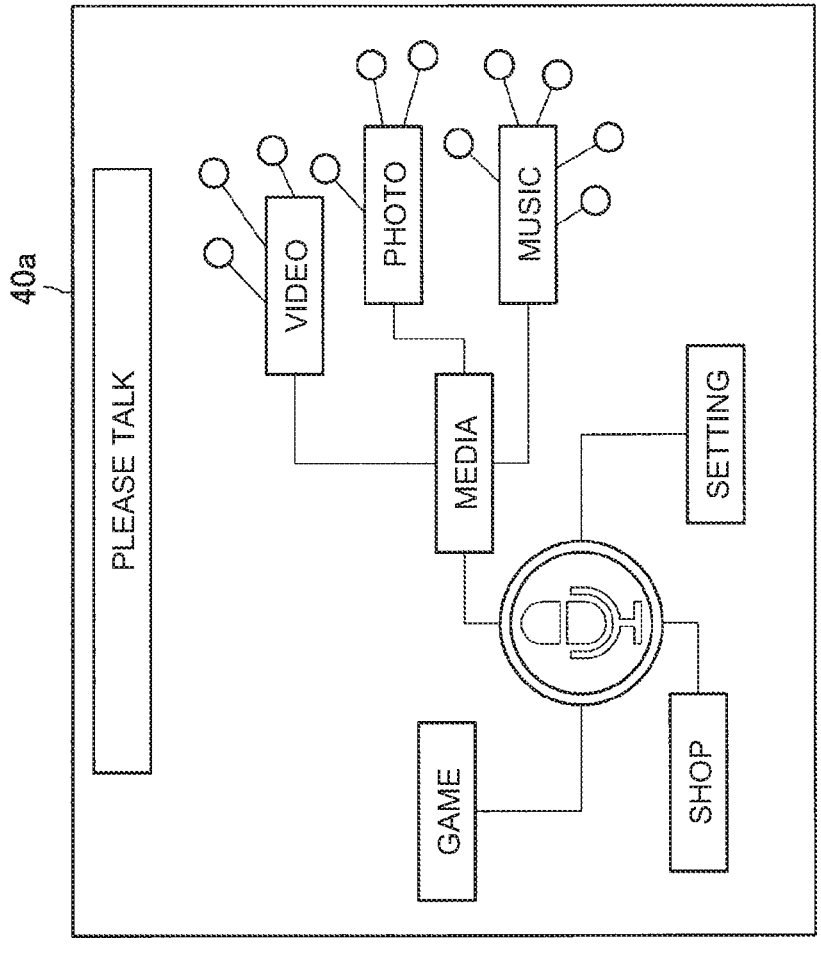
FIG. 7 is a diagram illustrating an example of switching a user interface to be used by a user, according to the same embodiment.
Figure 8:
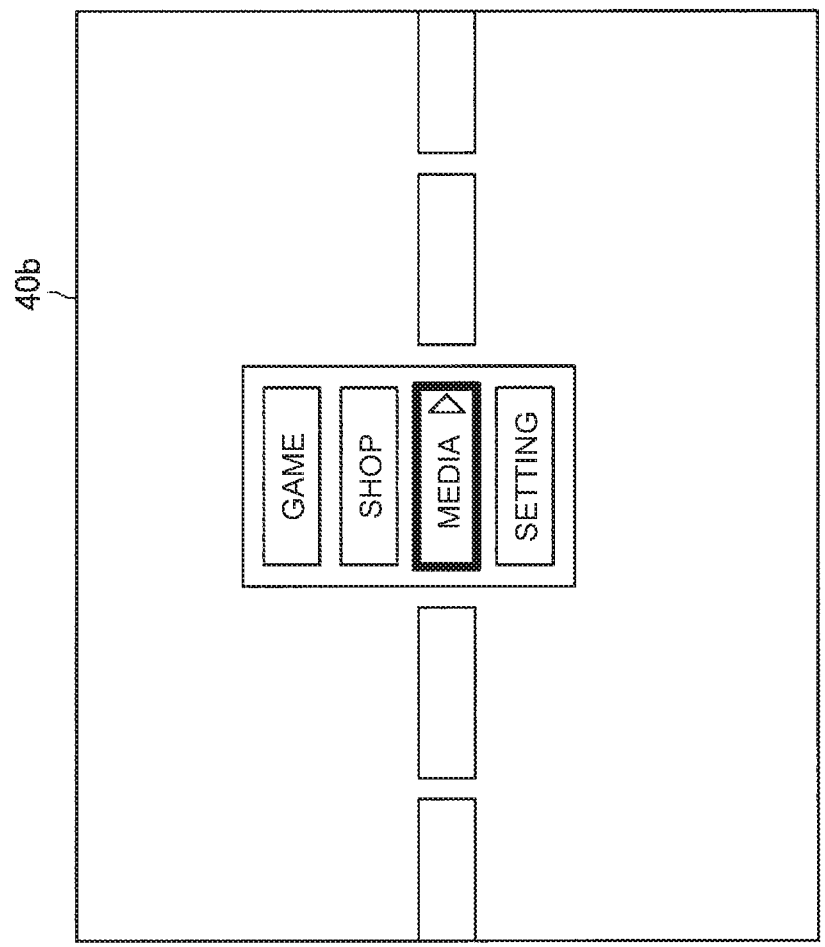
FIG. 8 is a diagram illustrating an example of switching a user interface to be used by a user, according to the same embodiment.

Furthermore, in a case where the type of user interface to be used by the user is switched, the interface control unit 104 can cause the output unit 224 to display a UI screen corresponding to the switched user interface. For example, in a case where the user interface to be used by the user is switched to the voice UI, the interface control unit 104 causes the output unit 224 to display a screen 40*a* of the voice UI as illustrated in FIG. 7. Further, in a case where the user interface to be used by the user is switched to the GUI (for example, a drill-down UI), the interface control unit 104 causes the output unit 224 to display a screen 40*b* of the GUI as illustrated in FIG. 8.

(2-1-3-1. Attribute Information)

Hereinafter, the contents of switching the user interface by the interface control unit 104 will be described in more detail. For example, in a case where the other conditions are the same, the interface control unit 104 may switch the user interface to be used by the user at least between the voice UI and the second UI on the basis of the attribute information (for example, age) of the user stored in the attribute information DB 124. As an example, in a case where the other conditions are the same and the user is a "child", the interface control unit 104 may decide the voice UI as the user interface to be used by the user. In a case where the other conditions are the same and the user is an "adult", the interface control unit 104 may decide the GUI as the user interface to be used by the user.

FIG. 5 is a diagram illustrating a configuration example of the attribute information DB 124. As illustrated in FIG. 5, in the attribute information DB 124, for example, a user name 1240, an age 1242, and a gender 1244 are associated. Here, the name of each user may be stored in the user name 1240. The age of each user may be stored in the age 1242. Further, the gender of each user may be stored in the gender 1244.

(2-1-3-2. Proficiency Level)

Alternatively, in a case where the other conditions are the same, the interface control unit 104 may switch the user interface to be used by the user at least between the voice UI and the second UI on the basis of the user's proficiency level stored in the proficiency level DB 126.

For example, in a case where the other conditions are the same, the interface control unit 104 may switch the user interface to be used by the user at least between the voice UI and the second UI on the basis of whether the user is accustomed to operating an input unit (for example, a controller or a mouse) connected to the terminal 20 in a wired or wireless manner. As an example, in a case where the user is accustomed to operating the input unit, the interface control unit 104 may decide the GUI as the user interface to be used by the user. In a case where the user is not accustomed to operating the input unit, the interface control unit 104 may decide the voice UI as the user interface to be used by the user.

Alternatively, in a case where the other conditions are the same, the interface control unit 104 may switch the user interface to be used by the user at least between the voice UI and the second UI on the basis of the length of a game usage history of the user. For example, in a case where the length of the game usage history of the user is equal to or greater than a predetermined threshold, the interface control unit 104 may decide the GUI as the user interface to be used by the user. In addition, in a case where the length of the game usage history of the user is less than the predetermined threshold, the interface control unit 104 may decide the voice UI as the user interface to be used by the user.

Alternatively, in a case where the other conditions are the same, the interface control unit 104 may switch the user interface to be used by the user at least between the voice UI and the second UI on the basis of the length of a voice input history of the user. For example, in a case where the length of the voice input history of the user is equal to or greater than a predetermined threshold, the interface control unit 104 may decide the voice UI as the user interface to be used by the user. Further, in a case where the length of the voice input history of the user is less than the predetermined threshold, the interface control unit 104 may decide the GUI as the user interface to be used by the user.

Alternatively, in a case where the other conditions are the same, the interface control unit 104 may switch the user interface to be used by the user at least between the voice UI and the second UI on the basis of the length of a usage history of the user for a target service. For example, in a case where the length of the usage history of the user for the target service is equal to or greater than a predetermined threshold, the interface control unit 104 may decide the voice UI as the user interface to be used by the user. In addition, in a case where the length of the usage history of the user for the target service is less than the predetermined threshold, the interface control unit 104 may decide the GUI as the user interface to be used by the user.

FIG. 6 is a diagram illustrating a configuration example of the proficiency level DB 126. As illustrated in FIG. 6, in the proficiency level DB 126, for example, a user name 1260, a proficiency level 1262 for operation of a game machine, a game usage history 1264, a proficiency level 1266 for a voice input, and a target service usage history 1268 are associated. Here, the name of each user may be stored in the user name 1260. Further, a proficiency level of the user regarding the operation of the game machine (for example, whether or not the user is accustomed) may be stored in the proficiency level 1262 for operation of the game machine. In addition, the game usage history of the user may be stored in the game usage history 1264. In addition, the proficiency level of the user regarding a voice input (for example, whether or not the user is accustomed) may be stored in the proficiency level 1266 for the voice input. Further, the usage history of the user for the target service may be stored in the target service usage history 1268.

(2-1-3-3. Degree of Concentration of User)

Hereinafter, the contents of the above-described environmental information will be described in more detail. For example, the environmental information may include a detection result of the degree of concentration of the user. In this case, in a case where the other conditions are the same, the interface control unit 104 may switch the user interface to be used by the user at least between the voice UI and the second UI on the basis of a comparison between the sensed degree of concentration of the user and a predetermined threshold. For example, in a case where the sensed degree of concentration of the user is equal to or greater than the predetermined threshold, the interface control unit 104 may decide the voice UI as the user interface to be used by the user. Further, in a case where the sensed degree of concentration of the user is less than the predetermined threshold, the interface control unit 104 may decide the GUI as the user interface to be used by the user.

Note that the degree of concentration of the user may be determined on the basis of whether or not the change in position of the gazing point of the user in a display screen of a video game is small while the user is playing the video game. For example, in a case where the change in position of the gazing point of the user in the display screen is small, it may be determined that the degree of concentration of the user is high. Further, in a case where the change in position of the gazing point of the user in the display screen is large, it may be determined that the degree of concentration of the user is low. Alternatively, the degree of concentration of the user may be determined on the basis of whether or not the degree of increase in the heart rate of the user per unit time is equal to or greater than a predetermined threshold. For example, in a case where it is detected that the degree of increase in the heart rate of the user per unit time is equal to or greater than the predetermined threshold, it may be determined that the degree of concentration of the user is high. Further, in a case where it is detected that the degree of increase in the heart rate of the user per unit time is less than the predetermined threshold, it may be determined that the degree of concentration of the user is low.

(2-1-3-4. Distance Between System and User)

In addition, the environmental information may include a detection result of the distance between the system (for example, the output unit 224 or the sensor unit 222) and the user. In this case, in a case where the other conditions are the same, the interface control unit 104 may switch the user interface to be used by the user at least between the voice UI and the second UI on the basis of a comparison between a predetermined threshold and a sensing result of the distance between the system and the user. For example, in a case where the sensing result of the distance between the system and the user is equal to or greater than the predetermined threshold, the interface control unit 104 may decide the voice UI as the user interface to be used by the user. Further, in a case where the sensing result of the distance between the system and the user is less than the predetermined threshold, the interface control unit 104 may decide the GUI as the user interface to be used by the user.

As an example, while the user is cooking, in a case where the distance between the user and the system is continuously equal to or greater than a predetermined distance or in a case where the distance between the user and the system is frequently changed, the interface control unit 104 may decide the voice UI as the user interface to be used by the user. In addition, in a case where it is detected that the distance between the user and the system is continuously less than the predetermined distance, the interface control unit 104 may decide the GUI as the user interface to be used by the user.

(2-1-3-5. Posture of User)

In addition, the environmental information may include a detection result of the posture of the user. In this case, in a case where the other conditions are the same and it is detected that the posture of the user is a relaxed posture, the interface control unit 104 may decide the voice UI as the user interface to be used by the user. Further, in a case where other conditions are the same and it is detected that the user is standing, the interface control unit 104 may decide the voice UI as the user interface to be used by the user. Further, in a case where the other conditions are the same and it is detected that the user is lying down, the interface control unit 104 may decide the voice UI as the user interface to be used by the user, as illustrated in FIG. 7, for example. Further, in a case where the other conditions are the same and it is detected that the user is sitting, the interface control unit 104 may decide the GUI as the user interface to be used by the user, as illustrated in FIG. 8, for example.

For example, in a case where it is detected that the length of time for which one or more parts of the user (hand, foot, or head) are continuously moving is equal to or greater than the predetermined time, the interface control unit 104, may decide the voice UI as the user interface to be used by the user. A specific example of such a case is a case where the user is cooking. Further, in a case where the length of time for which the user's body is continuously moving is less than the predetermined time or in a case where one or more parts of the user are hardly moving, the interface control unit 104 may decide the GUI as the user interface to be used by the user. A specific example of such a case is a case where the user is sitting on a sofa and reading a book.

(2-1-3-6. Awareness of User)

In addition, the environmental information may include a detection result regarding awareness of the user. In this case, in a case where the other conditions are the same and it is detected that the awareness of the user is concentrated, the interface control unit 104 may decide the voice UI as the user interface to be used by the user. In addition, in a case where the other conditions are the same and it is detected that the awareness of the user is not concentrated (for example, that the user is absent-minded), the interface control unit 104 may decide the GUI as the user interface to be used by the user.

(2-1-3-7. Estimation Result of Behavior Purpose of User)

Further, the environmental information may include an estimation result of the behavior purpose of the user (for example, an estimation result of the user interface that the user wants to use). For example, in a case where the other conditions are the same, the interface control unit 104 may decide to allow the user to use the user interface indicated by the estimation result of the user interface that the user wants to use.

The user interface that the user wants to use can be estimated using the following method, for example. For example, in a case where it is detected that the user repeatedly hits a button in a predetermined controller that is connected to the terminal 20 in a wired or wireless manner during the loading of an application (for example, a game) that the user is trying to use, the control unit 100 may estimate the user interface that the user wants to use as the GUI. Further, in a case where it is detected that the user has uttered a predetermined activation word corresponding to the voice UI multiple times during the activation of the application or the device to be used by the user, the control unit 100 may estimate the user interface that the user wants to use as the voice UI.

(2-1-3-8. Fatigue Level of User)

In addition, the environmental information may include a detection result of a fatigue level of the user. In this case, in a case where the other conditions are the same, the interface control unit 104 may switch the user interface to be used by the user at least between the voice UI and the second UI on the basis of a comparison between the fatigue level of the user calculated based on the sensing result and a predetermined threshold. For example, in a case where the calculated fatigue level of the user is equal to or greater than the predetermined threshold, the interface control unit 104 may decide the GUI as the user interface to be used by the user. In addition, in a case where the calculated fatigue level of the user is less than the predetermined threshold, the interface control unit 104 may decide the voice UI as the user interface to be used by the user.

Note that the fatigue level of the user may be determined on the basis of whether or not the duration of the video game by the user exceeds a predetermined time while the user is playing the video game. For example, in a case where the duration of the video game by the user exceeds the predetermined time, it may be determined that the fatigue level of the user is high. Further, in a case where the duration of the video game by the user is within the predetermined time, it may be determined that the fatigue level of the user is low.

(2-1-3-9. Visual Field of User)

In addition, the environmental information may include a detection result regarding a visual field of the user. In this case, in a case where the other conditions are the same, the interface control unit 104 may switch the user interface to be used by the user at least between the voice UI and the second UI on the basis of a determination result as to whether the user is able to visually recognize the front of the user, which is on the basis of the sensing result by the terminal 20. For example, in a case where it is determined that the user is not able to visually recognize the front of the user, the interface control unit 104 may decide the voice UI as the user interface to be used by the user. Further, in a case where it is determined that the user is able to visually recognize the front of the user, the interface control unit 104 may decide the GUI as the user interface to be used by the user.

Note that whether or not the user is able to visually recognize the front of the user may be determined on the basis of, for example, the degree of opening of the pupil of the user, or the presence or absence of a shield in front of both eyes of the user.

(2-1-3-10. Usage Status of Voice Input)

Further, the environmental information may include information indicating a usage status of a voice input by the user (for example, a usage status of a voice input using another device). In this case, in a case where the other conditions are the same, the interface control unit 104 may switch the user interface to be used by the user at least between the voice UI and the second UI on the basis of a detection result as to whether or not the user has used the voice input within a predetermined time. For example, in a case where it is determined that the user has used the voice input within the predetermined time from now, the interface control unit 104 may decide the voice UI as the user interface to be used by the user. Further, in a case where it is determined that the user has not used the voice input within the predetermined time from now, the interface control unit 104 may decide the GUI as the user interface to be used by the user.

Figure 9:
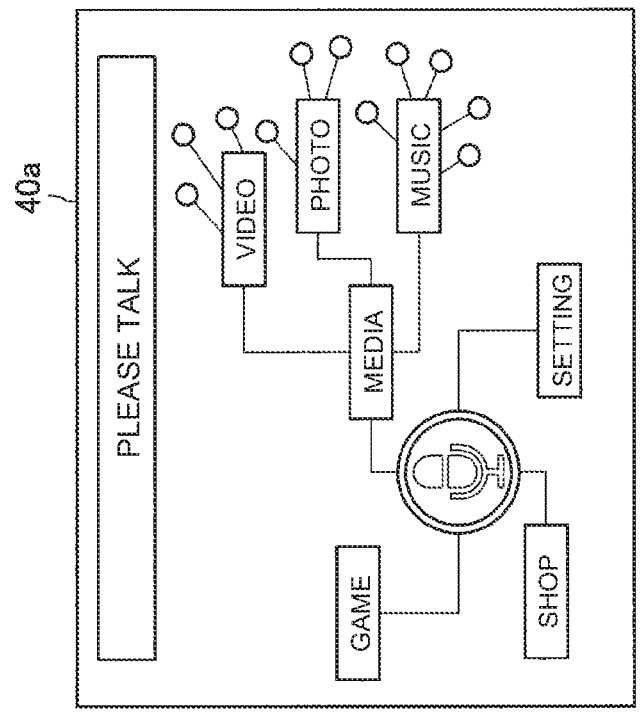
FIG. 9 is a diagram illustrating an example of switching a user interface to be used by a user, according to the same embodiment.

Here, the above functions will be described in more detail with reference to FIGS. 9 and 10. As illustrated in FIG. 9, it is assumed that a user 2 has performed a voice search using a smartphone 50 (which is a device different from the terminal 20) just before. Then, as illustrated in FIG. 9, the user 2 starts cooking in the house. In this case, first, the control unit 100 determines that the user 2 has used a voice input just before on the basis of the sensing result (for example, an image captured by a camera included in the sensor unit 222) within a predetermined time from now by the sensor unit 222, which is received from the terminal 20. Then, as illustrated in FIG. 9, the interface control unit 104 may decide to allow the user 2 to use the voice UI during the cooking on the basis of the determination result. Further, as illustrated in FIG. 9, the interface control unit 104 may display the screen 40*a* of the voice UI on the terminal 20 (output unit 224).

Figure 10:
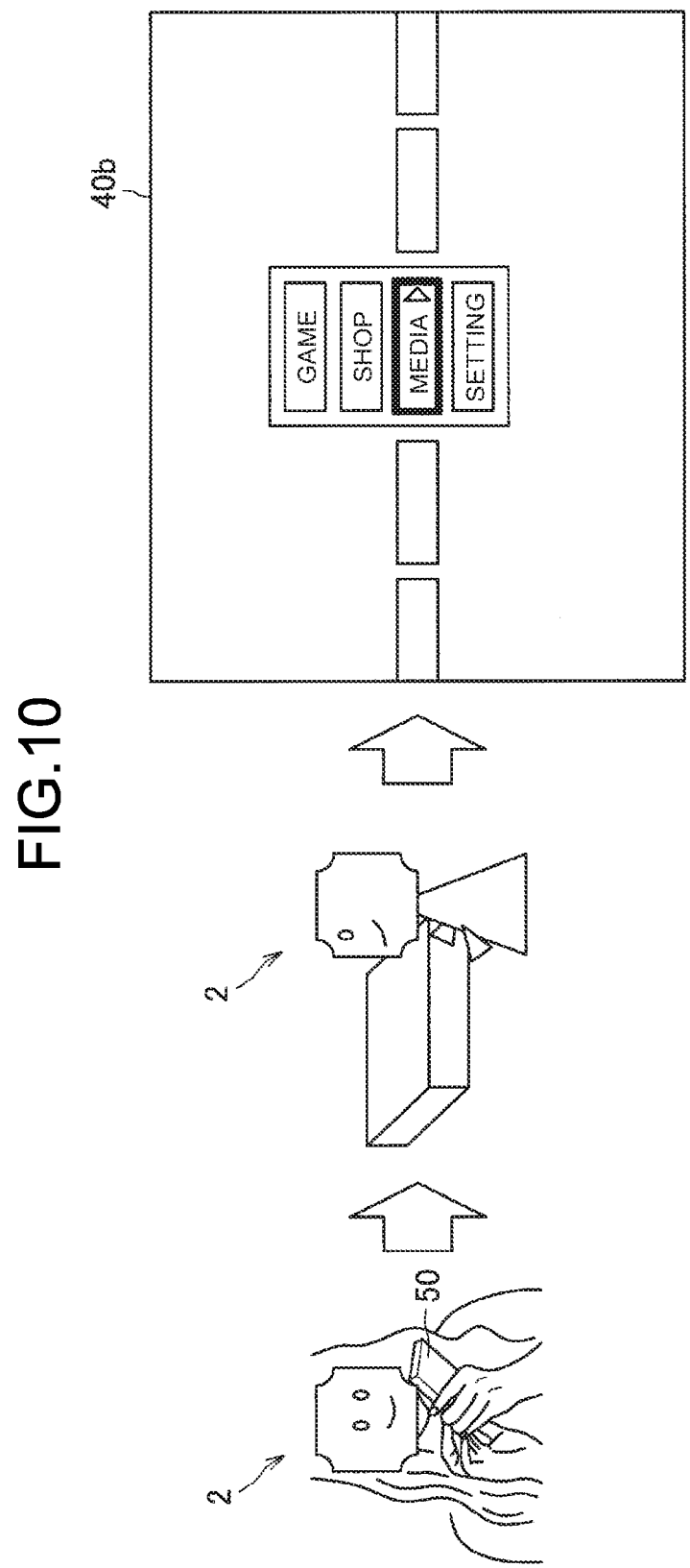
FIG. 10 is a diagram illustrating an example of switching a user interface to be used by a user, according to the same embodiment.

Alternatively, as illustrated in FIG. 10, it is assumed that the user 2 has performed a touch operation on the smartphone 50 just before. Then, as illustrated in FIG. 10, the user 2 starts cooking in the house. In this case, first, the control unit 100 determines that the user 2 has not previously used a voice input on the basis of the sensing result (for example, a captured image) within a predetermined time from now by the sensor unit 222, which is received from the terminal 20. Then, the interface control unit 104 may decide to allow the user 2 to use the GUI during the cooking on the basis of the determination result. Further, as illustrated in FIG. 10, the interface control unit 104 may display the screen 40*b* of the GUI on the terminal 20 (output unit 224).

(2-1-3-11. Ambient Noise)

In addition, the environmental information may include a sensing result of the ambient noise of the system (for example, the output unit 224 or the sensor unit 222). In this case, in a case where the other conditions are the same, the interface control unit 104 may switch the user interface to be used by the user at least between the voice UI and the second UI on the basis of a comparison between a predetermined threshold and a sensing result of the volume of the ambient noise of the system. For example, in a case where the volume of the ambient noise of the system is equal to or greater than a predetermined threshold, the interface control unit 104 may decide the GUI as the user interface to be used by the user. In addition, in a case where the volume of the ambient noise of the system is less than the predetermined threshold, the interface control unit 104 may decide the voice UI as the user interface to be used by the user.

As an example, in a case where the volume of noise collected by the terminal 20 (sensor unit 222) from the user's direction is continuously equal to or greater than a predetermined threshold (for example, in a case of washing the dishes) in the scene where the user is cooking, the interface control unit 104 may decide the GUI as the user interface to be used by the user. Further, in a case where the volume of noise collected by the terminal 20 (sensor unit 222) from the user's direction is less than the predetermined threshold (for example, in a case of watching the heat of the pot), the interface control unit 104 may decide the voice UI as the user interface to be used by the user.

Here, the noise may include, for example, the utterance of other users located around the target user, an output voice from a device other than the terminal 20 (for example, a television receiver), a soliloquy of the target user, or animal calls of a pet. Whether or not the collected utterance is a soliloquy may be determined on the basis of whether words (for example, "Eh" or "seriously?") that are frequently used as a soliloquy are included in the voice recognition result for the utterance collected by the sensor unit 222, for example. Alternatively, in a case where it is determined that the meaning corresponding to the voice recognition result for the utterance collected by the sensor unit 222 cannot be specified (OOD: Out Of Domain), it may be determined that the utterance is a soliloquy. Alternatively, in a case where it is determined that the volume of the utterance collected by the sensor unit 222 is relatively lower than the volume of the past voice input, it may be determined that the utterance is a soliloquy. As the background of this, for example, in a case of the utterance without self-confidence or the utterance with vague intentions, the volume of the utterance is relatively low.

As a modification example, a case may be considered in which the output unit 224 outputs a sound that cancels the ambient noise (for example, a sound having a phase opposite to the phase of the noise) by a technique such as echo cancellation or noise cancellation. In such a case, since the volume of the ambient noise is reduced, the interface control unit 104 may decide the GUI as the user interface to be used by the user.

(2-1-3-12. Approval or Disapproval Regarding Voice Usage of User by Other Users)

Further, the environmental information may include information indicating approval or disapproval regarding the voice usage of the user by other users located around the user (in the real space). In this case, in a case where the other conditions are the same and it is determined that other users located around the user have a positive intention regarding the voice usage of the user, the interface control unit 104 may decide the voice UI as the user interface to be used by the user. Further, in a case where the other conditions are the same and it is determined that other users located around the user have a negative intention regarding the voice usage of the user, the interface control unit 104 may decide the GUI as the user interface to be used by the user.

Figure 11:
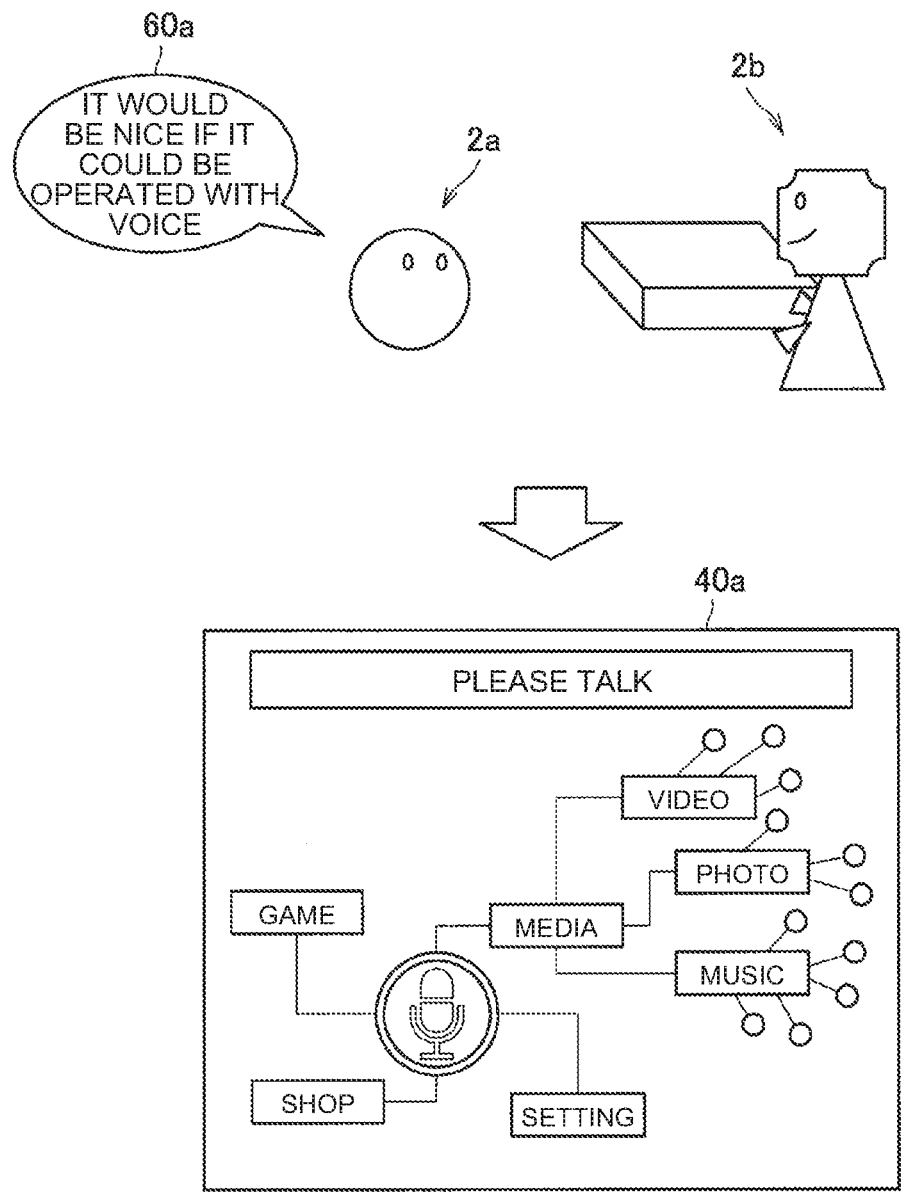
FIG. 11 is a diagram illustrating an example of switching a user interface to be used by a user, according to the same embodiment.

Here, the above functions will be described in more detail with reference to FIGS. 11 and 12. In the example illustrated in FIG. 11, it is assumed that a user 2*b* has been cooking just before and a user 2*a* has been helping the user 2*b*. Further, it is assumed that the user 2*b* has performed any operation on the terminal 20 using the GUI during the cooking. After that, as illustrated in FIG. 11, it is assumed that the user 2*a* has made a positive utterance 60*a* regarding the voice usage of the user 2*b*, such as "it would be nice if it could be operated with the voice". In this case, first, the control unit 100 performs voice recognition on the collection results of the utterance 60*a* which are collected by the sensor unit 222 and are received from the terminal 20, and then it is determined that the meaning corresponding to the utterance 60a is positive meaning regarding the voice usage of the user 2b. Therefore, the interface control unit 104 may decide to allow the user 2b to use the voice UI when the user 2b tries to cook on another day, for example. Then, in this case, as illustrated in FIG. 11, the screen 40a of the voice UI may be displayed on the terminal 20 (output unit 224).

Figure 12:
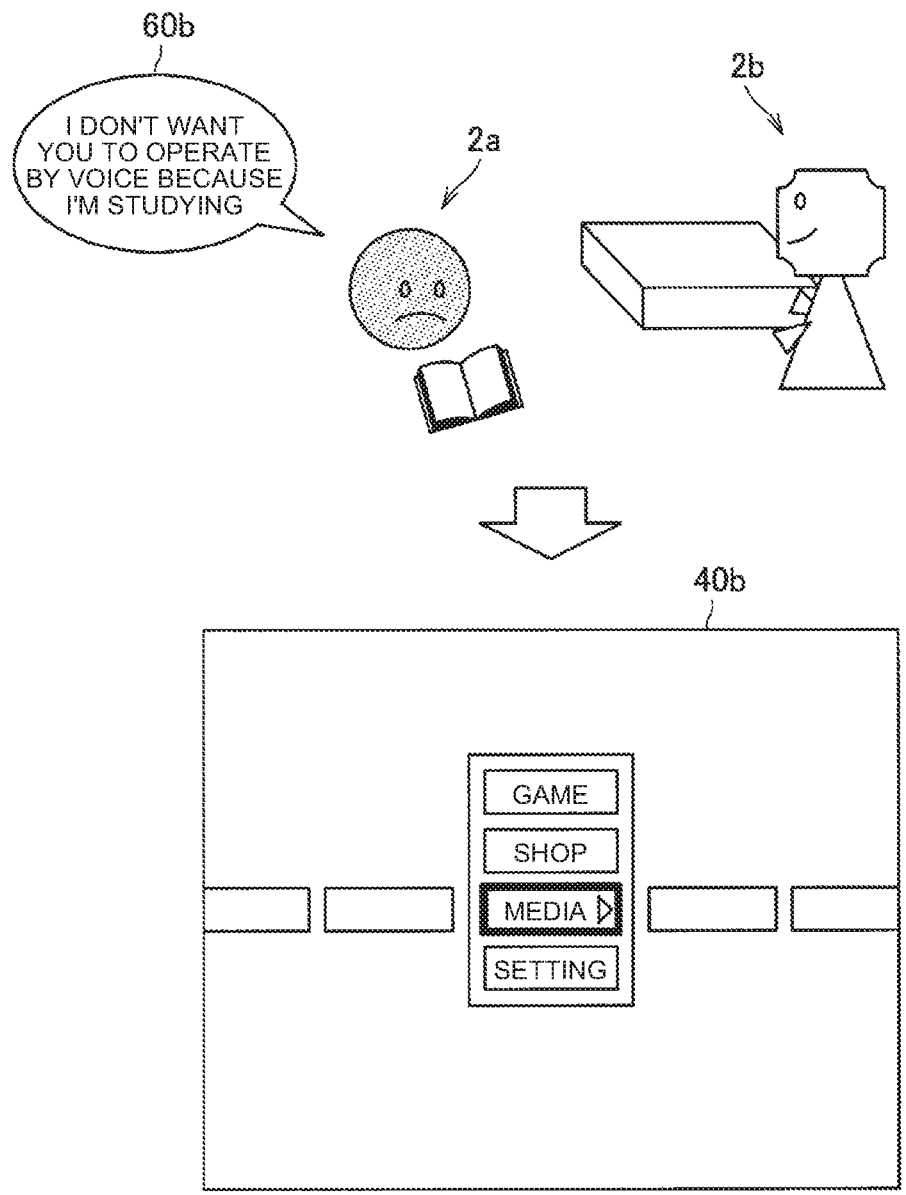
FIG. 12 is a diagram illustrating an example of switching a user interface to be used by a user, according to the same embodiment.

Alternatively, as illustrated in FIG. 12, it is assumed that the user 2b has been cooking just before and the user 2a has been reading near the user 2b. Further, it is assumed that the user 2b has performed any operation on the terminal 20 using the voice input during the cooking. After that, as illustrated in FIG. 12, it is assumed that the user 2a has made a negative utterance 60b regarding the voice usage of the user 2b, such as "I don't want you to operate by voice because I'm studying". In this case, first, the control unit 100 performs voice recognition on the collection results of the utterance 60b which are collected by the sensor unit 222 and are received from the terminal 20, and then it is determined that the meaning corresponding to the utterance 60b is negative meaning regarding the voice usage of the user 2b. Therefore, the interface control unit 104 may decide to allow the user 2b to use the GUI when the user 2b tries to cook on another day, for example. Then, in this case, as illustrated in FIG. 12, the interface control unit 104 may display the screen 40b of the GUI on the terminal 20 (output unit 224).

(2-1-3-13. Status of Surrounding User)

In addition, the environmental information may include information indicating a status of other users located around the user (in real space). In this case, in a case where the other conditions are the same, the interface control unit 104 may switch the user interface to be used by the user at least between the voice UI and the second UI on the basis of the information indicating the status of the other users. For example, in a case where it is determined that at least one of the other users is concentrated on the work, the interface control unit 104 may decide the GUI as the user interface to be used by the user. In a case where it is determined that all of the other users are not concentrated on the work or in a case where it is determined that all of the other users are not working, the interface control unit 104 may decide the voice UI as the user interface to be used by the user.

(2-1-3-14. Approval or Disapproval of Surrounding Voice Usage in Virtual Space)

Further, the environmental information may include at least one of information indicating approval or disapproval regarding the voice usage of the user by other users while the user is using the virtual reality application. Here, the other users may be other users who are located around the user (in the real space), or other users who are using the virtual reality application together.

In this case, in a case where the other conditions are the same and it is determined that the other users have a positive intention regarding the voice usage of the user while the user is using the virtual reality application, the interface control unit 104 may decide the voice UI as the user interface to be used by the user. In this case, in a case where the other conditions are the same and it is determined that the other users have a negative intention regarding the voice usage of the user while the user is using the virtual reality application, the interface control unit 104 may decide the GUI as the user interface to be used by the user.

(2-1-3-15. Modification Example)

As a modification example, the interface control unit 104 may decide the type of the user interface to be used by the user on the basis of a combination of a plurality of kinds of information included in the environmental information described above. For example, the interface control unit 104 may decide the type of the user interface to be used by the user by evaluating "the degree of the ambient noise of the system" and "the distance between the system and the user" with priority over other kinds of information among the plurality of kinds of information.

As an example, it is assumed that the degree of concentration of the user for some work is low and the volume of noise is equal to or less than a predetermined threshold. In this case, the interface control unit 104 may decide the voice UI as the user interface to be used by the user by evaluating "the volume of noise is low" with priority over "the degree of concentration of the user is low". In addition, it is assumed that the user is busy and moving around, and the volume of noise is greater than a predetermined threshold. In this case, the interface control unit 104 may decide the GUI as the user interface to be used by the user by evaluating "the volume of noise is high" with priority over "the movement of the user is large".

Alternatively, the user may be able to select information that is evaluated with priority over other kinds of information among the plurality of kinds of information. For example, in a case where the user's child is an examinee, for the months before the exam date, information evaluated with the highest priority over the plurality of kinds of information may be determined as "approval or disapproval regarding the voice usage of the user by other users".

{2-1-4. Communication Unit 120}

The communication unit 120 can be configured to include a communication device 166 described below. The communication unit 120 transmits and receives information to and from other devices. For example, the communication unit 120 transmits control information for executing the switching of the user interface decided by the interface control unit 104, to the terminal 20 under the control of the interface control unit 104. Further, the communication unit 120 receives various sensing results from the terminal 20.

{2-1-5. Storage Unit 122}

The storage unit 122 can be configured to include a storage device 164 described below. The storage unit 122 stores various kinds of data and various kinds of software. For example, as illustrated in FIG. 4, the storage unit 122 stores the attribute information DB 124 and the proficiency level DB 126.

2-2. Flow of Processing

Figure 13:
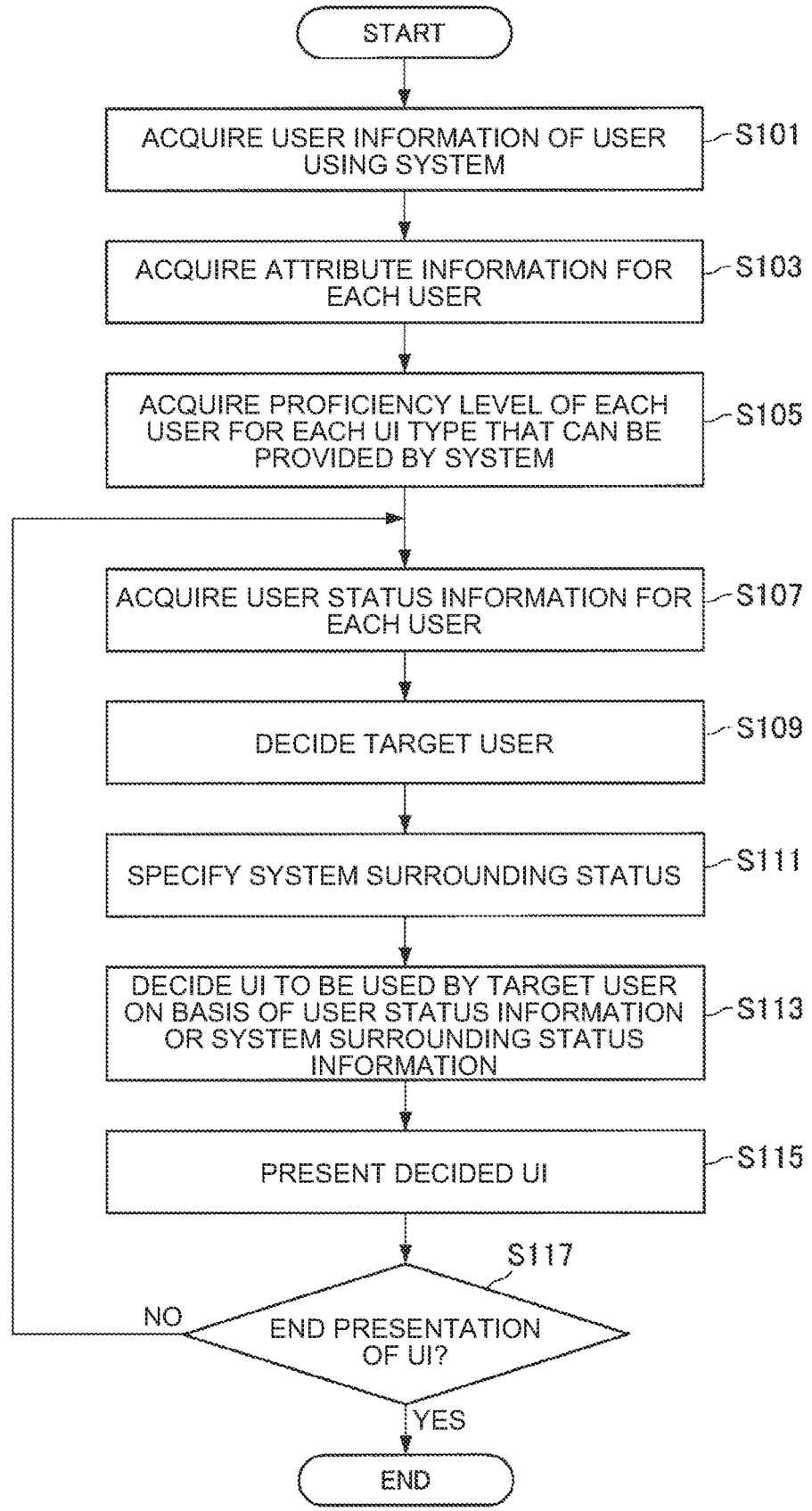
FIG. 13 is a diagram illustrating an example of a flow of processing according to the same embodiment.

The configuration of the embodiment has been described above. Next, a flow of processing according to the embodiment will be described. FIG. 13 is a flowchart illustrating an example of a flow of the processing according to the embodiment. As illustrated in FIG. 13, first, the control unit 100 of the server 10 acquires user information of a user who uses the system (for example, the terminal 20). For example, the control unit 100 first specifies a user who uses the system on the basis of information (for example, a captured image) received from the terminal 20, and acquires user information of the specified user from, for example, the storage unit 122 (S101).

Subsequently, the control unit 100 acquires attribute information of each user who uses the system from the attribute information DB 124 (S103).

Subsequently, the control unit 100 acquires, for each UI type that can be provided by the system, a proficiency level of each user regarding the UI type from the proficiency level DB 126 (S105).

Subsequently, the control unit 100 acquires user status information of each user. For example, the control unit 100 specifies a status of the user for each user on the basis of various sensing results by the terminal 20, and acquires the specified result as status information of the user (S107).

Subsequently, the control unit 100 decides a target user (for example, a user who is a target for using the system) on the basis of a predetermined criterion (S109).

Subsequently, the control unit 100 specifies a surrounding status of the system on the basis of various sensing results or the like by the terminal 20 (S111).

Subsequently, the interface control unit 104 decides the user interface to be used by the user on the basis of environmental information which corresponds to the latest user status information of the user acquired in S107 and the latest surrounding status of the system specified in S111 (S113).

Subsequently, the interface control unit 104 presents the user interface decided in S113 to the target user so as to cause the target user to use the target user interface (S115).

Then, the interface control unit 104 determines whether to end the presentation of the user interface to the target user (S117). In a case where it is determined that the presentation of the user interface is ended (S117: Yes), the flow of the processing is ended.

On the other hand, in a case where it is determined that the presentation of the user interface is to be continued (S117: No), the server 10 repeats the processing of S107 and thereafter again.

2-3. Effects

As described above, the server 10 according to the embodiment switches the user interface to be used by the user at least between the voice UI and the second UI on the basis of the environmental information. Therefore, it is possible to allow the user to use the user interface most suitable for a status. For example, the server 10 can allow the user to use the optimal user interface according to the volume of the ambient noise, an allowance degree of a voice input in an environment where the user is located, the user's physical condition, or the latest voice usage status of the user. As a result, the user convenience can be improved.

3. Application Example

The embodiment is not limited to the above-described example, and various application examples are applicable. Next, application examples of the embodiment will be described in "3-1. Application Example 1" to "3-5. Application Example 5". Note that each component included in the server 10 according to each application example is the same as the example illustrated in FIG. 4. In the following, only components having functions different from those of the above-described embodiment will be described, and description of the same contents will be omitted.

3-1. Application Example 1

{3-1-1. Behavior Status of User}

For example, the environmental information according to the embodiment is not limited to the example described above. As an example, the environmental information may include information indicating the behavior status of the user. For example, the interface control unit 104 may decide the type of user interface to be used by the user, on the basis of the distance between a microphone included in, for example, the sensor unit 222 and the user's mouth. For example, in a case where the distance between the microphone and the user's mouth is equal to or greater than a predetermined distance, the interface control unit 104 may decide the voice UI as the user interface to be used by the user. Further, in a case where the distance between the microphone and the user's mouth is less than the predetermined distance, the interface control unit 104 may decide the GUI as the user interface to be used by the user. The predetermined distance may be determined on the basis of, for example, information of the performance of the microphone.

Alternatively, the interface control unit 104 may decide the type of user interface to be used by the user on the basis of the distance between the input unit and the user's body. For example, in a case where the distance between the input unit and the user's body is equal to or greater than a predetermined distance, the interface control unit 104 may decide the voice UI as the user interface to be used by the user. Further, in a case where the distance between the input unit and the user's body is less than the predetermined distance, the interface control unit 104 may decide the GUI as the user interface to be used by the user.

Alternatively, the interface control unit 104 may decide the type of user interface to be used by the user on the basis of whether or not the user is in conversation. For example, in a case where the user is in conversation, the interface control unit 104 may decide the GUI as the user interface to be used by the user. In addition, in a case where the user is not in conversation, the interface control unit 104 may decide the voice UI as the user interface to be used by the user.

{3-1-2. Environment Where User is Located}

Alternatively, the environmental information may include information indicating the type of environment where the user is located. For example, it can be frustrating for a user to speak while the user is on a train. Therefore, while the user is on a train, the interface control unit 104 may decide the second UI (for example, gesture UI or line-of-sight UI) as the user interface to be used by the user. Then, when the user gets off the train, the interface control unit 104 may seamlessly switch the user interface to be used by the user from the gesture UI to the voice UI.

Alternatively, in a case where the user is in a car, the interface control unit 104 may decide the type of user interface to be used by the user on the basis of the seat where the user is sitting. For example, in a case where the user is sitting in the driver's seat (that is, in a case where the user is the driver), the user needs to grasp the steering wheel. Therefore, in this case, the interface control unit 104 may decide the voice UI as the user interface to be used by the user.

Alternatively, in a case where the user is sitting in the driver's seat of the vehicle, the interface control unit 104 may decide the type of user interface to be used by the user on the basis of who the fellow passenger is. For example, in a case where the fellow passenger is a family member or friend of the user, the interface control unit 104 may decide the voice UI as the user interface to be used by the user. Further, for example, in a case where the user is a taxi driver and the fellow passenger is a customer, the interface control unit 104 may decide the line-of-sight UI as the user interface to be used by the user. According to this method, since the user does not need to utter to operate the system, it is possible to avoid hindering the customer.

Alternatively, in a case where the user is a medical staff (a doctor, a nurse, or the like) and is in an operating room, the user needs to hold a surgical instrument, for example.

Therefore, in this case, the interface control unit 104 may decide the voice UI as the user interface to be used by the user.

3-2. Application Example 2

{3-2-1. Interface Control Unit 104}

Application Example 1 has been described above. Next, Application Example 2 according to the embodiment will be described. The interface control unit 104 according to Application Example 2 can switch the user interface to be used by the user at least between the voice UI and the second UI only on the basis of the attribute information of the user.

{3-2-2. Flow of Processing}

Figure 14:
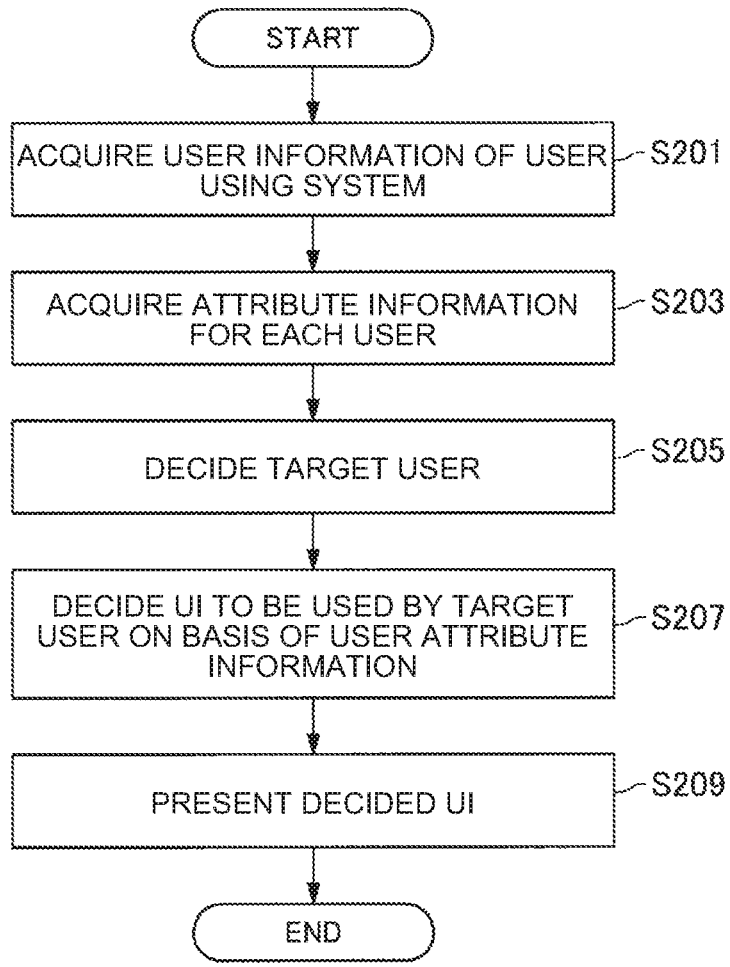
FIG. 14 is a diagram illustrating an example of a flow of processing according to Application Example 2 of the same embodiment.

Here, a flow of processing according to Application Example 2 will be described with reference to FIG. 14. Note that S201 to S203 illustrated in FIG. 14 are the same as S101 to S103 illustrated in FIG. 13. Further, S205 illustrated in FIG. 14 is the same as S109 illustrated in FIG. 13.

As illustrated in FIG. 14, after S205, the interface control unit 104 decides the user interface to be used by the target user decided in S205 only on the basis of the attribute information of the user (S207).

Note that S209 illustrated in FIG. 14 is the same as S115 illustrated in FIG. 13.

3-3. Application Example 3

Application Example 2 has been described above. Next, Application Example 3 according to the embodiment will be described. According to Application Example 3, the user interface to be used by the user can be switched on the basis of the user's explicit intention.

{3-3-1. Interface Control Unit 104}

The interface control unit 104 according to Application Example 3 decides the type of user interface to be used by the user, on the basis of the user's operation on a user interface selection screen or the user's operation on the input unit, for example.

{3-3-2. Flow of Processing}

Here, a flow of processing according to Application Example 3 will be described with reference to FIG. 15. In the example illustrated in FIG. 15, a case in which the user interface selection screen is displayed by the output unit 224 is assumed.

Figure 15:
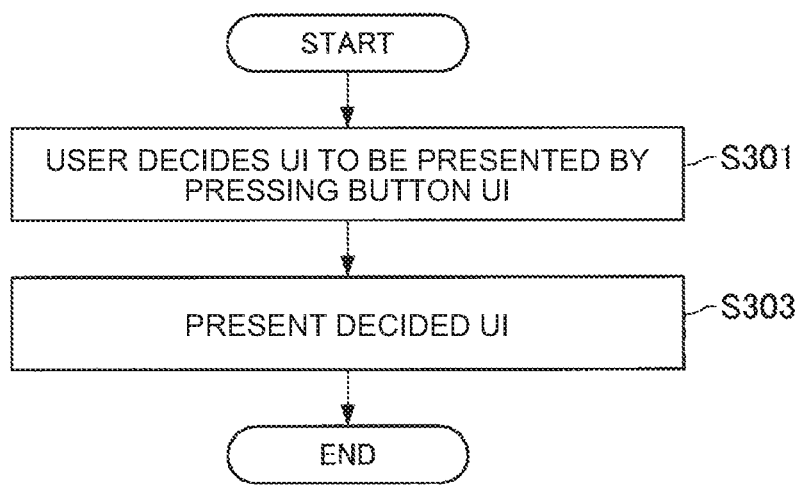
FIG. 15 is a diagram illustrating an example of a flow of processing according to Application Example 3 of the same embodiment.

As illustrated in FIG. 15, first, the user presses a selection button displayed on the selection screen to select a desired user interface. Then, the interface control unit 104 decides to allow the user to use the selected user interface (S301).

Note that S303 illustrated in FIG. 15 is the same as S115 illustrated in FIG. 13.

3-4. Application Example 4

Application Example 3 has been described above. Next, Application Example 4 according to the embodiment will be described.

{3-4-1. Interface Control Unit 104}

The interface control unit 104 according to Application Example 4 switches the user interface to be used by the user at least between the voice UI and the second UI on the basis of the determination results as to which user interface is allowed to be used by the user by the usage target service or usage target system of the user. For example, when the target service or the target system determines to allow the user to use the predetermined user interface, the interface control unit 104 (forcibly) switches the user interface to be used by the user to the predetermined user interface. As an example, it is assumed that the target service is a service relating to shopping (such as an electronic commerce (EC) service) and the target service determines to allow the user to use the voice UI at the time of shopping or the like. In this case, the interface control unit 104 may forcibly switch the user interface to be used by the user to the voice UI.

Alternatively, for example, in a case where the target service (or target system) recognizes that the sensitivity of the microphone included in the sensor unit 222 is extremely poor, the target service (or target system) can determine to allow the user to use the GUI. Then, the interface control unit 104 forcibly switches the user interface to be used by the user to the GUI on the basis of the determination result.

Here, the target service or target system may be a service or system that is being used or is scheduled to be used by the target user. Further, the target service or the target system may be managed by the server 10 or may be managed by another device (not illustrated) connected to the communication network 22.

{3-4-2. Flow of Processing}

Figure 16:
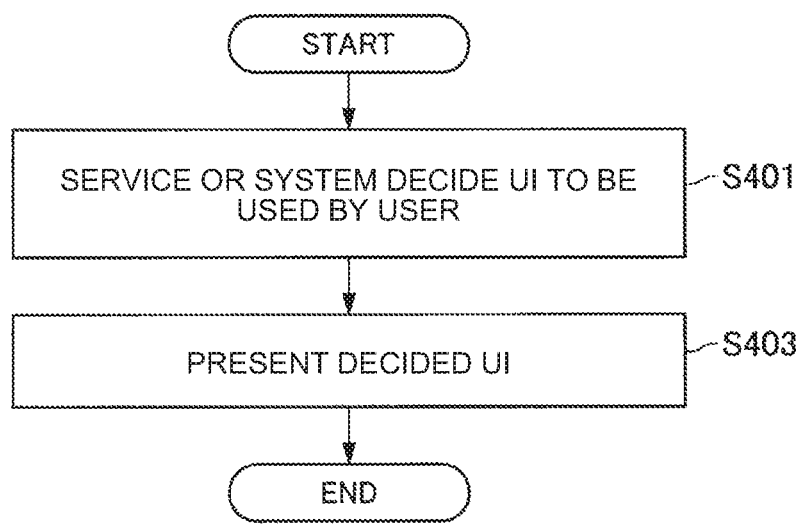
FIG. 16 is a diagram illustrating an example of a flow of processing according to Application Example 4 of the same embodiment.

Here, a flow of processing according to Application Example 4 will be described with reference to FIG. 16. As illustrated in FIG. 16, first, the target service or the target system decides the type of user interface currently used by the user on the basis of a predetermined criterion. Then, the interface control unit 104 decides to allow the user to use the determined user interface (S401).

Note that S403 illustrated in FIG. 16 is the same as S115 illustrated in FIG. 13.

3-5. Application Example 5

Application Example 4 has been described above. Next, Application Example 5 according to the embodiment will be described. As will be described below, according to Application Example 5, it is possible to appropriately decide the type of user interface in a case where a plurality of users use one user interface together.

{3-5-1. Interface Control Unit 104}

The interface control unit 104 according to Application Example 5 switches the user interface to be used by a plurality of users at least between the voice UI and the second UI on the basis of the sensing result of each state of the plurality of users in a case where the plurality of users are located within a predetermined range. For example, the interface control unit 104 decides to allow the plurality of users to use the user interface, which is determined to be easier to use, between the voice UI and the second UI.

Here, the above functions will be described in more detail with reference to FIG. 17. In the example illustrated in FIG. 17, it is assumed that two users are trying to use a predetermined application together. Further, as illustrated in FIG. 17, the user 2a is lying down and the user 2b is sitting on the sofa. For example, in a case where the user is lying down, the type of user interface most suitable for the user may be the voice UI. Further, in a case where the user is sitting on the sofa, the type of user interface most suitable for the user may be the GUI.

In the example illustrated in FIG. 17, the interface control unit 104 may decide that the GUI is easier to use than the voice UI, and then may decide to allow two users to use the GUI on basis of the determination result. Further, as illustrated in FIG. 17, the interface control unit 104 may display the screen 40b of the GUI on the terminal 20 (output unit 224).

4. Hardware Configuration

Figure 18:
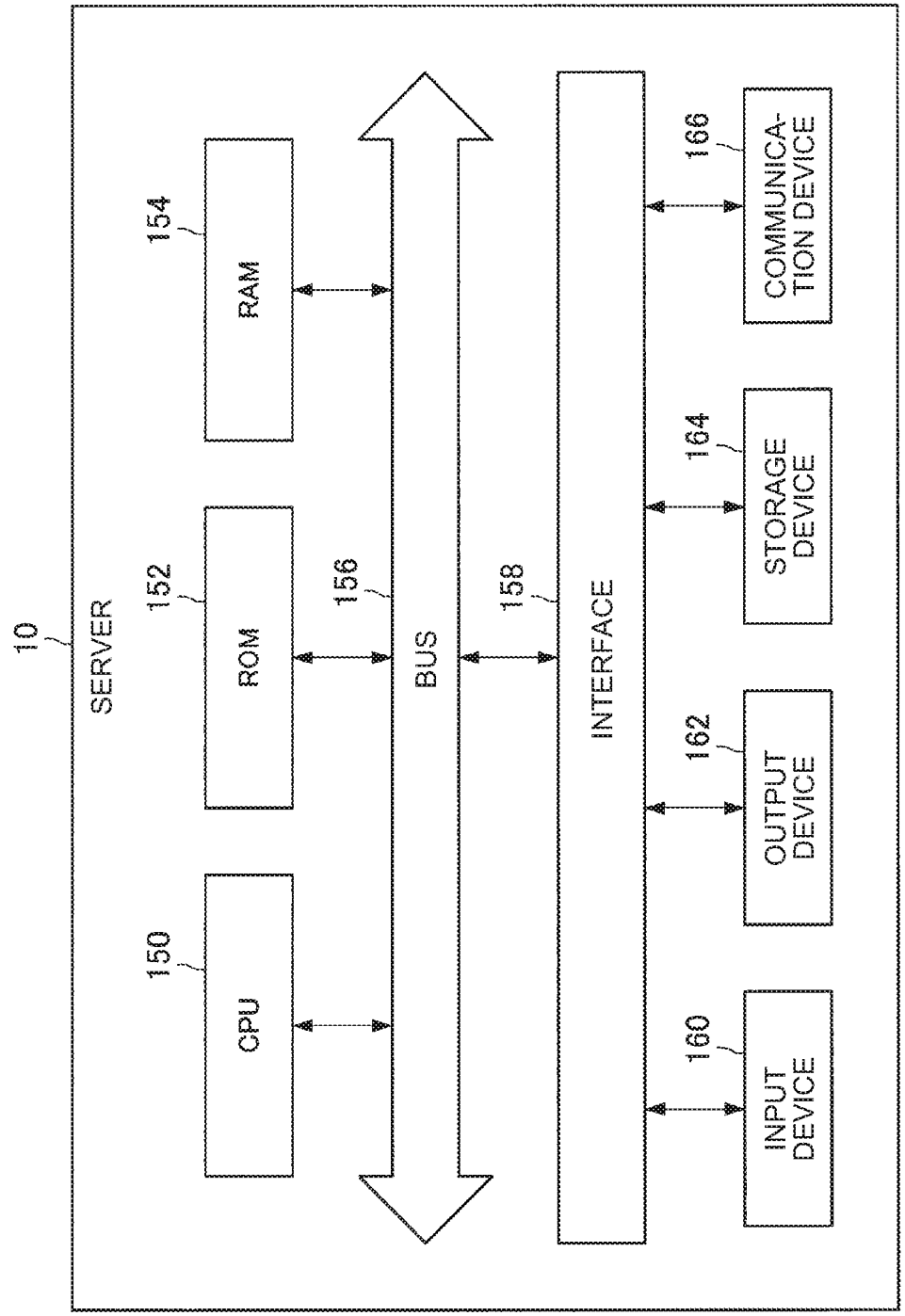
FIG. 18 is a diagram illustrating a hardware configuration example of the server 10.

Next, a hardware configuration example of the server 10 according to the embodiment will be described with reference to FIG. 18. As illustrated in FIG. 18, the server 10 includes the CPU 150, a read only memory (ROM) 152, a random access memory (RAM) 154, a bus 156, an interface 158, an input device 160, an output device 162, the storage device 164, and the communication device 166.

The CPU 150 functions as an arithmetic processing device and a control device, and controls overall operations in the server 10 according to various programs. Further, the CPU 150 implements the functions of the control unit 100 in the server 10. Note that the CPU 150 is configured by a processor such as a microprocessor.

The ROM 152 stores programs used by the CPU 150, control data such as operation parameters, and the like.

The RAM 154 temporarily stores a program executed by the CPU 150 and data in use, for example.

The bus 156 includes a CPU bus and the like. The bus 156 connects the CPU 150, the ROM 152, and the RAM 154 to each other.

The interface 158 connects the input device 160, the output device 162, the storage device 164, and the communication device 166 to the bus 156.

The input device 160 includes, for example, input means for a user to input information, such as a touch panel, a button, a switch, a lever, and a microphone, and an input control circuit that generates an input signal on the basis of a user's input and outputs the input signal to the CPU 150.

The output device 162 includes a display such as an LCD or an OLED, or a display device such as a projector. Further, the output device 162 includes a voice output device such as a speaker.

The storage device 164 is a device that functions as the storage unit 122 and is for storing data. The storage device 164 includes, for example, a storage medium, a recording device that records data on the storage medium, a reading device that reads data from the storage medium, or a deletion device that deletes data recorded on the storage medium.

The communication device 166 is a communication interface including, for example, a communication device (for example, a network card) for the connection to the communication network 22 or the like. Further, the communication device 166 may be a wireless LAN-compatible communication device, a Long Term Evolution (LTE)-compatible communication device, or a wired communication device that performs wired communication. The communication device 166 functions as the communication unit 120.

5. Modification Example

The preferred embodiments of the present disclosure have been described above in detail with reference to the accompanying drawings, but the present disclosure is not limited to such examples. It is obvious that those having ordinary knowledge in the technical field to which the present disclosure pertains can conceive various changes or modifications within the scope of the technical idea described in the claims, and it is understood that these also belong to the technical scope of the present disclosure.

5-1. Modification Example 1

For example, the configuration of the terminal 20 is not limited to the example illustrated in FIG. 2. As an example, the terminal 20 may include all the components included in the control unit 100 of the server 10 described above. In this case, the information processing apparatus according to the present disclosure may be the terminal 20. Further, in this modification example, the server 10 may not necessarily be installed.

5-2. Modification Example 2

As another modification example, the information processing apparatus according to the present disclosure is not limited to the server 10, and may be another apparatus including all the components included in the control unit 100 of the server 10 described above. For example, the information processing apparatus may be a general-purpose PC, a tablet terminal, a game machine, a mobile phone such as a smart phone, a portable music player, a speaker, a projector, a wearable device such as an HMD or a smart watch, an in-vehicle device (car navigation device or the like), or a robot (for example, a humanoid robot or an autonomous vehicle).

5-3. Modification Example 3

Each step in the flow of processing of the above-described embodiment may not necessarily be processed in the order described. For example, each step may be processed in an appropriately changed order. Further, the steps may be partially processed in parallel or individually instead of being processed in time series. In addition, some of the described steps may be omitted, or another step may be further added.

Further, according to the above-described embodiment, it is possible to provide a computer program for causing hardware such as the CPU 150, the ROM 152, and the RAM 154 to exhibit the same functions as the configurations of the server 10 according to the embodiment. Further, a storage medium on which the computer program is recorded is provided.

Further, the effects described in this specification are merely illustrative or exemplary, and are not restrictive. That is, the technology according to the present disclosure can exhibit other effects that are obvious to those skilled in the art from the description in the present specification, in addition to or instead of the above effects.

Note that the following configuration also belongs to the technical scope of the present disclosure.

(1)

An information processing apparatus comprising:

an interface control unit that switches a user interface to be used by a first user at least between a first user interface using voice and a second user interface different from the first user interface on the basis of environmental information.

(2)

The information processing apparatus according to (1), wherein the environmental information includes at least one of a detection result of a degree of concentration of the first user, a detection result of a distance between an output unit that outputs information relating to the user interface or a sensor unit that performs sensing regarding the first user and the first user, a detection result of a posture of the first user, a detection result regarding awareness of the first user, an estimation result of a behavior purpose of the first user, a detection result of a fatigue level of the first user, a detection result regarding a visual field of the first user, information indicating a usage status of a voice input by the first user, a sensing result of an ambient noise of the output unit or the sensor unit, information indicating approval or disapproval regarding a voice usage of the first user by other users located around the first user, information indicating a status of the other users, and information indicating approval or disapproval regarding a voice usage of the first user by other users while the first user is using a virtual reality application.

(3)

The information processing apparatus according to (2), wherein the second user interface is a graphical user interface, a touch user interface, a line-of-sight user interface, or a gesture user interface.

(4)

The information processing apparatus according to (3), wherein the second user interface is the graphical user interface.

(5)

The information processing apparatus according to (3) or (4), wherein the interface control unit switches the user interface to be used by the first user at least between the first user interface and the second user interface further on the basis of a determination result as to which user interface is allowed to be used by the first user by a service or application to be used by the first user.

(6)

The information processing apparatus according to (5), wherein when the service or application that is being used by the first user determines to allow the first user to use any user interface, the interface control unit decides to allow the first user to use the user interface.

(7)

The information processing apparatus according to any one of (3) to (6), wherein the interface control unit switches the user interface to be used by the first user at least between the first user interface and the second user interface further on the basis of attribute information of the first user.

(8)

The information processing apparatus according to (7), wherein the interface control unit switches the user interface to be used by the first user at least between the first user interface and the second user interface further on the basis of a proficiency level of the first user for the first user interface or the second user interface.

(9)

The information processing apparatus according to any one of (3) to (8), wherein the environmental information includes the detection result of the distance between the output unit or the sensor unit and the first user, in a case where the distance between the output unit or the sensor unit and the first user is equal to or greater than a predetermined threshold, the interface control unit switches the user interface to be used by the first user to the first user interface, and in a case where the distance between the output unit or the sensor unit and the first user is less than the predetermined threshold, the interface control unit switches the user interface to be used by the first user to the second user interface.

(10)

The information processing apparatus according to any one of (3) to (8), wherein the environmental information includes the sensing result of the ambient noise of the output unit or the sensor unit, in a case where a sensed volume of the ambient noise of the output unit or the sensor unit is equal to or greater than a predetermined threshold, the interface control unit switches the user interface to be used by the first user to the second user interface, and in a case where the sensed volume of the ambient noise of the output unit or the sensor unit is less than the predetermined threshold, the interface control unit switches the user interface to be used by the first user to the first user interface.

(11)

The information processing apparatus according to any one of (3) to (8), wherein the environmental information includes the detection result of the degree of concentration of the first user, in a case where a sensed degree of concentration of the first user is equal to or greater than a predetermined threshold, the interface control unit switches the user interface to be used by the first user to the first user interface, and in a case where the sensed degree of concentration of the first user is less than a predetermined threshold, the interface control unit switches the user interface to be used by the first user to the second user interface.

(12)

The information processing apparatus according to any one of (3) to (8), wherein the environmental information includes the information indicating approval or disapproval regarding a voice usage of the first user by the other users, in a case where the other users have a positive intention regarding a voice usage of the first user, the interface control unit switches the user interface to be used by the first user to the first user interface, and in a case where the other users have a negative intention regarding a voice usage of the first user, the interface control unit switches the user interface to be used by the first user to the second user interface.

(13)

The information processing apparatus according to any one of (3) to (8), wherein the environmental information includes the information indicating a status of the other users, in a case where it is determined that at least one of the other users is concentrated on work, the interface control unit switches the user interface to be used by the first user to the second user interface, and in a case where it is determined that all of the other users are not concentrated on the work or are not working, the interface control unit switches the user interface to be used by the first user to the first user interface.

(14)

The information processing apparatus according to any one of (3) to (8), wherein the environmental information includes the detection result of a posture of the first user, in a case where it is detected that the first user is standing, the interface control unit switches the user interface to be used by the first user to the first user interface, and in a case where it is detected that the first user is sitting, the interface control unit switches the user interface to be used by the first user to the second user interface.

(15)

The information processing apparatus according to any one of (3) to (8), wherein the environmental information includes the detection result regarding a visual field of the first user, in a case where it is determined that the first user is not able to visually recognize a front of the first user, the interface control unit switches the user interface to be used by the first user to the first user interface, and in a case where it is determined that the first user is able to visually recognize the front of the first user, the interface control unit switches the user interface to be used by the first user to the second user interface.

(16)

The information processing apparatus according to any one of (3) to (8), wherein the environmental information includes the information indicating a usage status of a voice input by the first user, in a case where the first user has used a voice input within a predetermined time, the interface control unit switches the user interface to be used by the first user to the first user interface, and in a case where the first user has not used the voice input within the predetermined time, the interface control unit switches the user interface to be used by the first user to the second user interface.

(17)

The information processing apparatus according to any one of (3) to (16), wherein in a case where the first user and a second user are located in a predetermined range, the interface control unit switches the user interface to be used by the first user and the second user at least between the first user interface and the second user interface on the basis of a sensing result of a state of the first user and a sensing result of a state of the second user.

(18)

The information processing apparatus according to (17), wherein the interface control unit decides to allow the first user and the second user to use a user interface determined to be easier to use, between the first user interface and the second user interface.

(19)

An information processing method comprising: causing a processor to switch a user interface to be used by a first user at least between a first user interface using voice and a second user interface different from the first user interface on the basis of environmental information.

(20)

A program causing a computer to function as an interface control unit that switches a user interface to be used by a first user at least between a first user interface using voice and a second user interface different from the first user interface on the basis of environmental information.

REFERENCE SIGNS LIST

10 SERVER
20 TERMINAL
22 COMMUNICATION NETWORK
100, 200 CONTROL UNIT
102 RECOGNITION UNIT
104 INTERFACE CONTROL UNIT
120, 220 COMMUNICATION UNIT
122, 226 STORAGE UNIT
124 ATTRIBUTE INFORMATION DB
126 PROFICIENCY LEVEL DB
222 SENSOR UNIT
224 OUTPUT UNIT

The invention claimed is:

1. An information processing apparatus, comprising:
a memory configured to store a database of a proficiency level of each user of a plurality of users for a first user interface and a second user interface different from the first user interface, wherein the first user interface is based on voice input; and
a processor configured to switch a user interface to be used by a first user between the first user interface and the second user interface, wherein
the switch of the user interface between the first user interface and the second user interface is based on a combination of the proficiency level of the first user stored in the database and environmental information, and
the proficiency level of the first user for the first user interface is based on voice input history of the first user.

2. The information processing apparatus according to claim 1, wherein the environmental information includes one of a detection result of a degree of concentration of the first user, a detection result of a distance between one of an output unit that outputs information relating to the user interface or a sensor unit that performs detection regarding the first user and the first user, a detection result of a posture of the first user, a detection result regarding awareness of the first user, an estimation result of a behavior purpose of the first user, a detection result of a fatigue level of the first user, a detection result regarding a visual field of the first user, information indicating a usage status of the voice input by the first user, a sensing result of an ambient noise of one of the output unit or the sensor unit, information indicating approval or disapproval regarding a voice usage of the first user by other users located around the first user, information indicating a status of the other users, and information indicating the approval or the disapproval regarding the voice usage of the first user by the other users during usage of a virtual reality application by the first user.

3. The information processing apparatus according to claim 2, wherein the second user interface is one of a graphical user interface, a touch user interface, a line-of-sight user interface, or a gesture user interface.

4. The information processing apparatus according to claim 3, wherein the second user interface is the graphical user interface.

5. The information processing apparatus according to claim 3, wherein
the processor is further configured to switch the user interface between the first user interface and the second user interface further based on a determination result, and
the determination result corresponds to the user interface that is allowed to be used by the first user by one of a service or an application to be used by the first user.

6. The information processing apparatus according to claim 5, wherein
the processor is further configured to allow the first user to use a third user interface as the user interface, and
the third user interface is based on a determination by one of the service or the application used by the first user.

7. The information processing apparatus according to claim 3, wherein the processor is further configured to switch the user interface between the first user interface and the second user interface based attribute information of the first user.

8. The information processing apparatus according to claim 2, wherein
in a case where the distance between one of the output unit or the sensor unit and the first user is equal to or greater than a threshold, the processor is further configured to switch the user interface to be used by the first user to the first user interface, and in a case where the distance between one of the output unit or the sensor unit and the first user is less than the threshold, the processor is further configured to switch the user interface to be used by the first user to the second user interface.

9. The information processing apparatus according to claim 2, wherein in a case where a sensed volume of the ambient noise of one of the output unit or the sensor unit is equal to or greater than a threshold, the processor is further configured to switch the user interface to be used by the first user to the second user interface, and in a case where the sensed volume of the ambient noise of one of the output unit or the sensor unit is less than the threshold, the processor is further configured to switch the user interface to be used by the first user to the first user interface.

10. The information processing apparatus according to claim 2, wherein in a case where a sensed degree of concentration of the first user is equal to or greater than a threshold, the processor is further configured to switch the user interface to be used by the first user to the first user interface, and in a case where the sensed degree of concentration of the first user is less than the threshold, the processor is further configured to switch the user interface to be used by the first user to the second user interface.

11. The information processing apparatus according to claim 2, wherein in a case where the other users have a positive intention regarding the voice usage of the first user, the processor is further configured to switch the user interface to be used by the first user to the first user interface, and in a case where the other users have a negative intention regarding the voice usage of the first user, the processor is further configured to switch the user interface to be used by the first user to the second user interface.

12. The information processing apparatus according to claim 2, wherein the environmental information further includes the information indicating a status of the other users, in a case where at least one user of the other users is concentrated on work, the processor is further configured to switch the user interface to be used by the first user to the second user interface, and in a case where all of the other users are not concentrated on the work or are not working, the processor is further configured to switch the user interface to be used by the first user to the first user interface.

13. The information processing apparatus according to claim 2, wherein in a case where the first user is in a standing posture, the processor is further configured to switch the user interface to be used by the first user to the first user interface, and in a case where the first user is in a sitting posture, the processor is further configured to switch the user interface to be used by the first user to the second user interface.

14. The information processing apparatus according to claim 2, wherein in a case where the first user is not able to visually recognize a front of the first user, the processor is further configured to switch the user interface to be used by the first user to the first user interface, and in a case where the first user is able to visually recognize the front of the first user, the processor is further configured to switch the user interface to be used by the first user to the second user interface.

15. The information processing apparatus according to claim 2, wherein in a case where the first user has used the voice input within a determined time, the processor is further configured to switch the user interface to be used by the first user to the first user interface, and in a case where the first user has not used the voice input within the determined time, the processor is further configured to switch the user interface to be used by the first user to the second user interface.

16. The information processing apparatus according to claim 2, wherein in a case where the first user and a second user are located in a determined range, the processor is further configured to switch the user interface to be used by the first user and the second user between the first user interface and the second user interface based on a sensing result of a state of the first user and a sensing result of a state of the second user.

17. The information processing apparatus according to claim 16, wherein the processor is further configured to determine whether to allow the first user and the second user to use the user interface determined to be easier to use, between the first user interface and the second user interface.

18. An information processing method, comprising:
controlling a memory to store a database of a proficiency level of each user of a plurality of users for a first user interface and a second user interface different from the first user interface, wherein the first user interface is based on voice input; and
causing a processor to switch a user interface to be used by a first user between the first user interface and the second user interface, wherein
the switch of the user interface between the first user interface and the second user interface is based on a combination of the proficiency level of the first user stored in the database and environmental information, and
the proficiency level of the first user for the first user interface is based on voice input history of the first user.

19. A non-transitory computer-readable medium having stored thereon, computer-executable instructions, which when executed by a processor, cause the processor to execute operations, the operations comprising:
controlling a memory to store a database of a proficiency level of each user of a plurality of users for a first user interface and a second user interface different from the first user interface, wherein the first user interface is based on voice input; and
switching a user interface to be used by a first user between the first user interface and the second user interface, wherein
the switch of the user interface between the first user interface and the second user interface is based on a combination of the proficiency level of the first user stored in the database and environmental information, and
the proficiency level of the first user for the first user interface is based on voice input history of the first user.

* * * * *